(12) United States Patent
Okimoto et al.

(10) Patent No.: US 8,741,983 B2
(45) Date of Patent: Jun. 3, 2014

(54) ANTIFOULING COATING COMPOSITION INCLUDING A METAL-CONTAINING COPOLYMER, 4,5-DICHLORO-2-N-OCTYL-4-ISOTHIAZOLIN-3-ONE, AND METAL-PYRITHIONE COMPOUND AND USING THEREOF

(75) Inventors: Hiroyuki Okimoto, Hiroshima (JP); Yasuo Mukunoki, Hiroshima (JP); Toshihiko Ashida, Hiroshima (JP); Masashi Ono, Hiroshima (JP)

(73) Assignee: Chugoku Marine Paints, Ltd., Ohtake-shi (JP)

( * ) Notice: Subject to any disclaimer, the term of this patent is extended or adjusted under 35 U.S.C. 154(b) by 174 days.

(21) Appl. No.: 10/498,821

(22) PCT Filed: Dec. 18, 2002

(86) PCT No.: PCT/JP02/13244
§ 371 (c)(1), (2), (4) Date: Jun. 23, 2004

(87) PCT Pub. No.: WO2004/037932
PCT Pub. Date: May 6, 2004

(65) Prior Publication Data
US 2005/0065232 A1  Mar. 24, 2005

(30) Foreign Application Priority Data
Oct. 23, 2002  (JP) .................................. 2002-308820

(51) Int. Cl.
*C09D 5/16* (2006.01)
(52) U.S. Cl.
CPC .................................. *C09D 5/1668* (2013.01)
USPC .............................. 523/122; 524/83; 524/99
(58) Field of Classification Search
USPC ........................................ 523/122; 524/83, 99
See application file for complete search history.

(56) References Cited

U.S. PATENT DOCUMENTS

| 6,172,132 B1 * | 1/2001 | Nakamura et al. ............. 523/122 |
| 6,846,777 B2 * | 1/2005 | Antoni-Zimmermann et al. ............................. 504/126 |

FOREIGN PATENT DOCUMENTS

| EP | 1 006 156 A1 | 6/2000 | |
| EP | 1167398 | 1/2002 | |
| GB | 2 255 343 A | 11/1992 | |
| JP | 54-1571 | 1/1979 | |
| JP | 63-128084 | 5/1988 | |
| JP | 6-340504 | 12/1994 | |
| JP | 11-035877 | 2/1999 | |
| JP | 11-302572 | 11/1999 | |
| JP | 11-323209 | 11/1999 | |
| JP | 2002-12630 | 1/2002 | |
| JP | 2002-69360 | 3/2002 | |
| WO | WO 95/32862 | 12/1995 | |
| WO | 98/53015 | 11/1998 | |
| WO | WO 0215693 | * 2/2002 | ............. A01N 55/02 |

OTHER PUBLICATIONS

Derwent Publications Ltd., AN 2002-262475, XP-002444763, JP 2001-323208, Nov. 22, 2001 (abstract).

* cited by examiner

*Primary Examiner* — Vickey Nerangis
(74) *Attorney, Agent, or Firm* — Oblon, Spivak, McClelland, Maier & Neustadt, L.L.P.

(57) ABSTRACT

Antifouling coating compositions that do not substantially contain cuprous oxide and organotins, and that comprise: A) a metal-containing copolymer obtained by copolymerization of a polymerizable unsaturated monomer (a1) containing a metal and an unsaturated monomer (a2) capable of radical polymerization containing no metals; (B) 4,5-dichloro-2-n-octyl-4-isothiazolin-3-one; and (C) a metal pyrithione compound.

19 Claims, No Drawings

ANTIFOULING COATING COMPOSITION INCLUDING A METAL-CONTAINING COPOLYMER, 4,5-DICHLORO-2-N-OCTYL-4-ISOTHIAZOLIN-3-ONE, AND METAL-PYRITHIONE COMPOUND AND USING THEREOF

TECHNICAL FIELD

The present invention relates to an antifouling coating composition, an antifouling coating film and, covered with the antifouling coating film, a marine vessel, underwater structure and-fishing gear or fishing net, and further relates to a method of fouling prevention therewith. More particularly, the present invention relates to an antifouling coating composition from which an antifouling coating film, which can reduce burdens on the environment, realizing uniform wasting of coating film at a constant rate for a prolonged period of time and which can maintain excellent antifouling performance for a prolonged period of time, being applicable to even ocean-going vessels, can be formed. Furthermore, the present invention relates to such an antifouling coating film and, covered with the antifouling coating film, a marine vessel, underwater structure and fishing gear or fishing net and to a method of fouling prevention therewith.

BACKGROUND ART

Ship bottoms, underwater structures, fishing nets and the like, when exposed to water for a prolonged period of time, are likely to have their appearance and functions damaged by the attachment to surface and propagation thereon of various aquatic organisms including animals such as oysters, mussels and barnacles, plants such as seaweeds (laver) and bacteria.

In particular, when such an aquatic organism attaches to a ship's bottom and propagates thereon, it may occur that the surface roughness of the ship as a whole is increased to thereby lower the speed of the ship and increase the fuel consumed by the ship. Removing of the aquatic organism from the ship bottom necessitates spending of extensive labor and working time. Also, when bacteria attach to, for example, an underwater structure and propagate thereon and, further, slime (sludgy matter) attaches thereto to cause putrefaction, or when a large sticky organism attaches to the surface of an underwater structure, for-example, steel structure and propagates thereon-to thereby damage the coating for corrosion prevention provided on the underwater structure, there is the danger that damages such as deterioration of the strength and functions of the underwater structure and thus marked shortening of the life thereof are invited.

For preventing such damages, it is common practice to apply various antifouling paints to ship bottoms, etc. For example, the following antifouling paints have been proposed.

(1) Japanese Patent Laid-open Publication No. 63(1988)-128084 discloses an antifouling paint comprising as a vehicle a metal-containing resin composition obtained by heating a base resin containing an acid group, a metal salt of low-boiling-point organic basic acid (provided that the metal is a bivalent or higher valence metal having lower ionization tendency than those of alkali metals) and a high-boiling-point monobasic acid while removing low-boiling-point organic basic acids from the system so as to effect reaction thereof.

In Example 42 of this publication, there is disclosed an anti-fouling paint comprising a varnish of naphthenatocopper (meth)acrylate/MMA/2-ethylhexyl acrylate copolymer mixed with a tetraphenylborane pyridinium complex. Further, in Example 43 of this publication, there is disclosed an antifouling paint comprising a varnish of oleatozinc (meth) acrylate/MMA/ethyl acrylate copolymer mixed with cuprous oxide.

(2) The present applicant in Japanese Patent Laid-open Publication No. 11(1999)-323209 proposed an antifouling coating composition comprising (a) a (meth)acrylic acid metal salt based copolymer and (b) a pyridine triphenylboron or triphenylboron amine complex of the formula:

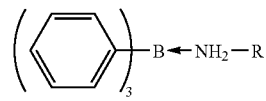

(in the formula, R is H, an alkyl having 3 to 30 carbon atoms, a substituted or unsubstituted pyridyl or a substituted or unsubstituted aromatic group).

(3) Furthermore, an antifouling paint comprising a complex, the complex composed of triphenylborane and an amine having 6 or more carbon atoms, and a hydrolyzable resin is disclosed, and as the hydrolyzable resin, there is mentioned a resin comprising a (meth)acrylic resin having at side chain ends thereof the formula: $(CH_2)_m.COO.M.L_n$ (wherein m: integer of 0 to 2, n: atomic valence of metal −1, M: Zn, Cu, etc. and L: alkyl, carboxyl, etc.) (see Japanese Patent Laid-open Publication No. 11(1999)-302572).

However, all the antifouling coating compositions described in the above publications (1) to (3) contain antifoulants, such as cuprous oxide, causing relatively heavy burdens on the environment. Accordingly, there has been room for further improvement to the obtained coating films from the viewpoint of, for example, reducing burdens on the environment.

Moreover, Japanese Patent Laid-open Publication No. 11(1999)-35877 and Japanese Patent Laid-open Publication No. 2002-12630 describe antifouling paints comprising metal-containing resin compositions. However, the development of antifouling paints of further enhanced performance has been demanded.

As apparent from the above, there is a demand for the development of an antifouling coating composition capable of forming a superior antifouling coating film which is wasted at constant rate irrespective of the coating location for a prolonged period of time and which can maintain excellent antifouling performance for a prolonged period of time, being applicable to ocean-going vessels.

In this situation, the inventor has conducted extensive and intensive studies. As a result, it has been found that the use of specified copolymer (A) containing a metal as a resin component and the simultaneous use of 4,5-dichloro-2-n-octyl-4-isothiazolin-3-one (B) combined with a metal pyrithione compound (C) as an antifoulant enable realizing excellent antifouling performance even without the use of cuprous oxide and an organotin. It has further been found that the coating film from the obtained antifouling coating composition exhibits various advantageous characteristics, such as reducing of burdens on the environment, wasting of coating film at constant rate irrespective of the coating location for a prolonged period of time, maintaining of excellent antifouling performance for a prolonged period of time, being applicable to ocean-going vessels, resistance to cracking and peeling, increased adhesion as compared with that of a coating film based on pyridine-triphenylborane, etc., sharp hue and reducing of discoloration after water immersion or exposure. The present invention has been completed on the basis of these findings.

The present invention has been made with a view toward solving the above problems of the prior art. It is an object of the present invention to provide an antifouling coating composition from which an excellent antifouling coating film, which can reduce burdens on the environment, realizing uniform wasting of coating film at a constant rate for a prolonged period of time (uniform wasting performance of coating film) and which can maintain excellent antifouling performance for a prolonged period of time (long-term antifouling performance maintaining capability), being applicable to even ocean-going vessels, can be formed. It is other objects of the present invention to provide such an antifouling coating film and, covered with the antifouling coating film, a marine vessel, underwater structure and fishing gear or fishing net and to provide a method of fouling prevention therewith.

DISCLOSURE OF THE INVENTION

According to the present invention, there is provided an antifouling coating composition substantially not containing cuprous oxide and organotins, characterized by comprising:
(A) a metal-containing copolymer obtained by copolymerization of a polymerizable unsaturated monomer (a1) containing a metal and an unsaturated monomer (a2) capable of radical polymerization containing no metals;
(B) 4,5-dichloro-2-n-octyl-4-isothiazolin-3-one; and
(C) a metal pyrithione compound.

It is preferred that substantially none of triphenylborane and tetraphenylborane compounds be contained in the antifouling coating composition of the present invention.

In the antifouling coating composition of the present invention, preferably 0.5 to 100 parts by weight, still preferably 1 to 50 parts by weight of 4,5-dichloro-2-n-octyl-4-isothiazolin-3-one (B) is contained per 100 parts by weight of metal-containing copolymer (A).

Further, in the antifouling coating composition of the present invention, preferably 0.1 to 40 parts by weight, still preferably 0.5 to 20 parts by weight of 4,5-dichloro-2-n-octyl-4-isothiazolin-3-one (B) is contained per 100 parts by weight of antifouling coating composition.

Still further, preferably 1 to 90 parts by weight, still preferably 5 to 55 parts by weight of metal pyrithione compound (C) is contained per 100 parts by weight of metal-containing copolymer (A).

Still further, preferably 0.2 to 40 parts by weight, still preferably 1 to 20 parts by weight of metal pyrithione compound (C) is contained per 100 parts by weight of antifouling coating composition.

Moreover, it is preferred that the antifouling coating composition of the present invention be loaded with zinc oxide (D). Still preferably, 5 to 100 parts by weight of zinc oxide (D) is contained per 100 parts by weight of metal-containing copolymer (A).

Preferably, an extender (E) selected from the group consisting of talc, silica, mica, clay, calcium carbonate and kaolin is further contained in the antifouling coating composition of the present invention.

Furthermore, the antifouling coating composition of the present invention is preferably loaded with an organic antifoulant (F) (excluding the 4,5-dichloro-2-n-octyl-4-isothiazolin-3-one (B) and the metal pyrithione compound (C)).

In the present invention, it is preferred that the polymerizable unsaturated monomer (a1) containing a metal be at least one monomer selected from the group consisting of metal (meth)acrylates, metal di(meth)acrylates and low polymerizates thereof.

In the present invention, preferably, the polymerizable unsaturated monomer (a1) containing a metal is a polymerizable compound obtained by reacting an inorganic metal compound with (meth)acrylic acid in the presence of an alcoholic organic solvent and water. Still preferably, the inorganic metal compound is an oxide, hydroxide or chloride of a metal selected from the group consisting of zinc, copper and magnesium.

Further, in the present invention, it is preferred that the polymerizable unsaturated monomer (a1) containing a metal comprise a metal di(meth)acrylate (a11) and a metal-containing monomer (a12) of the formula:

$$R^1\text{—COO—M—L}_n \quad (1)$$

wherein $R^1$ represents an organic group having unsaturated bond, selected from the group consisting of $CH_2=C(CH_3)-$, $CH_2=CH-$, $HOOC-CH=CH-$ and $HOOC-CH=C(CH_3)-$, provided that —COOH may form a metal salt or an ester;

M represents a metal atom;

L is an organic acid residue represented by $-OCOR^2$ (wherein $R^2$ represents an alkyl, a cycloalkyl, a substituted or unsubstituted aromatic hydrocarbon group or an aralkyl); and n is the number equal to the valence number of metal M–1.

In the present invention, preferably, the polymerizable unsaturated monomer (a1) containing a metal contains a metal selected from the group consisting of zinc, copper and magnesium.

Moreover, in the present invention, it is preferred that the unsaturated monomer (a2) capable of radical polymerization containing no metals consist of at least one monomer (a21) selected from the group consisting of (meth)acrylic acids and (meth)acrylic esters represented by the formula:

$$R^4OOC-C(R^3)=CH_2 \quad (2)$$

wherein $R^3$ represents a hydrogen atom or methyl, and $R^4$ represents an alkyl, a cycloalkyl or an aryl.

In the present invention, the unsaturated monomer (a2) capable of radical polymerization containing no metals preferably consists of at least one monomer (a21) of the above formula (2) and at least one monomer (a22) of the formula:

$$R^7R^6OOC-C(R^5)=CH_2 \quad (3)$$

(wherein $R^5$ represents a hydrogen atom or methyl, $R^6$ represents an alkylene, a cycloalkylene or an arylene, and $R^7$ represents a hydroxyl, an alkoxyl, a cycloalkoxyl or an aryloxyl).

In the antifouling coating composition of the present invention, the metal-containing copolymer (A) is preferably a copolymer comprising 2 to 50% by weight of component units derived from the polymerizable unsaturated monomer (a1) containing a metal and 50 to 98% by weight of component units derived from the unsaturated monomer (a2) capable of radical polymerization containing no metals.

In the present invention, it is preferred that the metal-containing copolymer (A) be a copolymer comprising 0.1 to 49.9% by weight of component units derived from the metal di(meth)acrylate (a11), 0.1 to 49.9% by weight of component units derived from the metal-containing monomer (a12) represented by the formula (1), and 50 to 98% by weight of component units derived from the unsaturated monomer (a2) capable of radical polymerization containing no metals.

In the present invention, also preferably, the metal-containing copolymer (A) is a copolymer comprising 0.1 to 49.9% by weight of component units derived from the metal di(meth)acrylate (a11), 0.1 to 49.9% by weight of component units derived from the metal-containing monomer (a12) represented by the formula (1), 0.1 to 97.9% by weight of component units derived from at least one monomer (a21) selected from the group consisting of (meth)acrylic acids and (meth)acrylic esters represented by the formula (2) and 0.1 to 97.9% by weight of component units derived from the monomer (a22) represented by the formula (3).

The antifouling coating film of the present invention is one produced from the above antifouling coating composition of the present invention.

The marine vessel or underwater structure according to the present invention is covered with a coating film produced from the above antifouling coating composition of the present invention.

The fishing gear or fishing net according to the present invention is covered with a coating film produced from the above antifouling coating composition of the present invention.

The method of rendering a marine vessel or underwater structure antifouling according to the present invention is characterized by covering a surface of marine vessel or underwater structure with a coating film produced from the above antifouling coating composition of the present invention.

The method of rendering a fishing gear or fishing net antifouling according to the present invention is characterized by covering a surface of fishing gear or fishing net with a coating film produced from the above antifouling coating composition of the present invention.

BEST MODE FOR CARRYING OUT THE INVENTION

The present invention will be described in detail below.

That is, the antifouling coating composition, antifouling coating film and, covered with the antifouling coating film, marine vessel, underwater structure and fishing gear or fishing net according to the present invention will be described in detail below.

<Antifouling Coating Composition>

The antifouling coating composition of the present invention is one substantially not containing cuprous oxide and organotins, which comprises (A) a metal-containing copolymer, (B) 4,5-dichloro-2-n-octyl-4-isothiazolin-3-one and (C) a metal pyrithione compound.

(A) Metal-containing Copolymer

In the present invention, the metal-containing copolymer (A) not only functions as a substrate for coating film formation but also exhibits antifouling capability. The metal-containing copolymer (A) for use in the present invention is obtained by copolymerization of a polymerizable unsaturated monomer (a1) containing a metal and an unsaturated monomer (a2) capable of radical polymerization containing no metals.

Polymerizable Unsaturated Monomer (a1) Containing a Metal

Although the polymerizable unsaturated monomer (a1) containing a metal is not limited as long as it contains a metal and acts as a polymerization monomer, there can be mentioned, for example, a metal di(meth)acrylate (a11) or a metal (meth)acrylate. Further, there can be mentioned a low polymerizate, such as a dimer or trimer, thereof which has polymerization activity. At least one of these monomers may be used alone or in combination. Herein, (meth)acryl means acryl and/or methacryl, and (meth)acrylate means acrylate and/or methacrylate.

As the metal di(meth)acrylate (a11), there can be mentioned, for example, magnesium acrylate of the formula $(CH_2=CHCOO)_2Mg$, magnesium methacrylate of the formula $(CH_2=C(CH_3)COO)_2Mg$, zinc acrylate of the formula $(CH_2=CHCOO)_2Zn$, zinc methacrylate of the formula $(CH_2=C(CH_3)COO)_2Zn$, copper acrylate of the formula $(CH_2=CHCOO)_2Cu$, copper methacrylate of the formula $(CH_2=C(CH_3)COO)_2Cu$ or the like. At least one of these may be selected and used. With respect to these metal di(meth)acrylates, it is preferred that a member selected from the group consisting of zinc, copper, calcium, aluminum and magnesium be contained as the metal. It is still preferred that a metal selected from the group consisting of zinc, copper and magnesium be contained.

Further, as the polymerizable unsaturated monomer (a1) containing a metal, there can be mentioned a polymerizable compound obtained by reacting an inorganic metal compound with a carboxylated compound. This component (a1) can be obtained by reacting an inorganic metal compound with a carboxylated compound preferably in the presence of water, still preferably in the presence of an alcoholic organic solvent and water.

Although the process for producing this polymerizable unsaturated monomer (a1) containing a metal is not particularly limited, for example, the component (a1) can be obtained by heating under agitation an inorganic metal compound and a carboxylated compound in the presence of an organic solvent and water at temperature not higher than the decomposition point of metal salt.

As the inorganic metal compound, use can be made of any of compounds which react with carboxylated compounds to thereby form metal salts. Examples thereof include metal oxides such as zinc oxide, aluminum oxide, calcium oxide, cupric oxide, magnesium oxide and manganese oxide; metal hydroxides such as zinc hydroxide, aluminum hydroxide, calcium hydroxide, cupric hydroxide and magnesium hydroxide; and metal chlorides such as zinc chloride, aluminum chloride, calcium chloride, cupric chloride, magnesium chloride and manganese chloride.

The metal of the inorganic metal compound is selected from among, for example, the metals of Groups Ib, IIa, IIb, IIIa, IIIb, IVa, IVb, Va, Vb, VIb, VIIb and VIII of the periodic table. The inorganic metal compounds may be used alone or, according to necessity, in combination.

As the inorganic metal compound, preferred use is made of an oxide, hydroxide or chloride of a metal selected from the group consisting of zinc, copper, calcium, aluminum and magnesium. Still preferred use is made of an oxide, hydroxide or chloride of a metal selected from the group consisting of zinc, copper and magnesium.

When a compound of Cu is used as the inorganic metal compound, it is preferred to use the same in combination with a compound of Zn from the viewpoint that the copolymerizability with an acrylic monomer can be increased.

The use of a compound of Zn, Mg, Ca or Al is preferred from the viewpoint that the obtained resin tends to have enhanced transparency. It is especially preferred to use a bivalent Zn or Mg compound from the viewpoint that the viscosity increase at resin production can be regulated.

In particular, when a compound of Zn or Mg is used, favorably, the transparency of obtained metal-containing copolymer (A) would be high and the tone of coating film would tend to be beautiful. Further, favorably, the solubility of such a compound in customarily employed organic solvents would be high to thereby tend to improve workability. The use of a compound of Zn is especially preferred from the viewpoint that the water resistance of obtained metal-containing copolymer (A) can be high.

As the carboxylated compound, there can be mentioned, for example, methacrylic acid, acrylic acid, itaconic acid, maleic acid (anhydride), a monoalkyl (e.g., methyl, ethyl, butyl, 2-ethylhexyl or the like) itaconate, a monoalkyl (e.g., methyl, ethyl, butyl, 2-ethylhexyl or the like) maleate or the like. These can be used alone or in combination. Among these carboxylated compounds, (meth)acrylic acid is preferably used, and methacrylic acid is especially preferably used.

In the preparation of polymerizable unsaturated monomer (a1) containing a metal with the use of an organic solvent, it is preferred that the organic solvent contain an alcoholic compound. The alcoholic compound is preferably an alcoholic solvent, such as ethanol, isopropanol, butanol or propylene glycol monomethyl ether.

The organic solvent for use to obtain the component (a1) may contain, according to necessity, an organic solvent other than the above alcoholic compound in combination with the alcoholic compound. As the organic solvent other than the alcoholic compound, there can be mentioned, for example, an aliphatic hydrocarbon solvent such as pentane, hexane or heptane; an aromatic hydrocarbon solvent such as benzene, toluene or xylene; an ester solvent such as ethyl acetate, butyl acetate or isobutyl acetate; or a ketone solvent such as methyl ethyl ketone, methyl isobutyl ketone or cyclohexanone. When the organic solvent other than the alcoholic compound is used in combination with the alcoholic compound, the ratio of alcoholic compound to the total amount of organic solvent is preferably 5% by weight or more, still preferably 25% by weight or more. When the organic solvent containing the alcoholic compound at this ratio is used, favorably, the solubility of polymerizable unsaturated monomer (a1) containing a metal in the solvent would be increased to thereby inhibit crystal formation, resulting in enhanced storage stability.

The metal content of polymerizable unsaturated monomer (a1) containing a metal, although depending on the type of metal, is preferably in the range of 0.1 to 60% by weight, still preferably 3 to 25% by weight. The metal content not exceeding 60% by weight is preferred from the viewpoint that the monomer is soluble in an organic solvent and can be mixed with an acrylic monomer and polymerized. On the other hand, the metal content of 0.1% by weight or more is preferred from the viewpoint that the metal-containing copolymer (A) can be produced efficiently.

In the production of polymerizable unsaturated monomer (a1) containing a metal in the above manner, although the ratio between inorganic metal compound and carboxylated compound is not particularly limited, it is preferred that the ratio of inorganic metal compound per mol of carboxylated compound be 0.6 mol or less from the viewpoint that the obtained metal-containing copolymer (A) can have high transparency. On the other hand, it is preferred that the ratio of inorganic metal compound per mol of carboxylated compound be 0.1 mol or more from the viewpoint that the coating film formed by obtained antifouling paint can excel in water resistance.

In the production of polymerizable unsaturated monomer (a1) containing a metal through reaction between an inorganic metal compound and a carboxylated compound, as aforementioned, it is preferred to heat under agitation an inorganic metal compound and a carboxylated compound in the presence of an organic solvent and water. In this reaction, the ratio of water to the total amount of inorganic metal compound, carboxylated compound, organic solvent and water (excluding the amount of water formed during reaction) is preferably in the range of 0.01 to 30% by weight, still preferably 0.2 to 15% by weight. When water is present in the reaction system in an amount of 0.01% by weight or more, the polymerizable unsaturated monomer (a1) containing a metal as resultant reaction product is obtained in the form of a solution, thereby enabling efficient copolymerization of the polymerizable unsaturated monomer (a1) containing a metal with an unsaturated monomer (a2) capable of radical polymerization containing no metals.

Upon the production of polymerizable unsaturated monomer (a1) containing a metal through reaction between an inorganic metal compound and a carboxylated compound in the presence of an alcoholic organic solvent and water, generally, a mixture of component (a1), organic solvent and water is subjected to copolymerization reaction with an unsaturated monomer (a2) capable of radical polymerization containing no metals. In the copolymerization with the component (a2), it is preferred that the component (a1) mixture contain water in an amount of 0.01 to 30% by weight, especially 0.2 to 15% by weight. When the amount of water is 30% by weight or less, the miscibility with the unsaturated monomer (a2) capable of radical polymerization containing no metals, such as an acrylic monomer, organic solvent, etc. would be high so as to enable efficient copolymerization of components (a1) and (a2). The water contained in the mixture containing the polymerizable unsaturated monomer (a1) containing a metal may be only water added to the reaction system for preparing the component (a1), or may include water further added after the preparation of component (a1). It is preferred that the amount of water contained in the mixture containing the component (a1) be in the range of 0.01 to 5, especially 0.05 to 3 times the molar amount of inorganic metal compound used (molar ratio) from the viewpoint of operation efficiency.

As the above polymerizable unsaturated monomer (a1) containing a metal, there can be mentioned, for example, a compound (a12) of the formula:

$$R^1—COO—M—L_n \quad (1)$$

wherein $R^1$ represents an organic group having unsaturated bond, selected from the group consisting of $CH_2=C(CH_3)—$, $CH_2=CH—$, $HOOC—CH=CH—$ and $HOOC—CH=C(CH_3)—$, provided that —COOH may form a metal salt or an ester;

M represents a metal atom;

L is an organic acid residue represented by —OCOR$^2$ (wherein $R^2$ represents an alkyl, a cycloalkyl, a substituted or unsubstituted aromatic hydrocarbon group, an aralkyl, or the same organic group having unsaturated bond as represented by the above $R^1$); and n is the number equal to the valence number of metal M−1.

In the above formula (1), M preferably represents Mg, Zn or Cu, and especially preferably represents Zn. As the L representing an organic acid residue, there can be mentioned a residue derived from a monovalent organic acid, such as monochloroacetic acid, monofluoroacetic acid, propionic acid, octylic acid, versatic acid, isostearic acid, palmitic acid, cresotic acid, α-naphthoic acid, β-naphthoic acid, benzoic acid, 2,4,5-trichlorophenoxyacetic acid, 2,4-dichlorophenoxyacetic acid, quinolinecarboxylic acid, nitrobenzoic acid, nitronaphthalenecarboxylic acid or pulvic acid. Among these, fatty acid residues are preferred.

Examples of the compounds represented by the above formula (1) include monochloroacetatomagnesium (meth)acrylate, monochloroacetatozinc (meth)acrylate, monochloroacetatocopper (meth)acrylate, monofluoroacetatomagnesium (meth)acrylate, monofluoroacetatozinc (meth)acrylate, monofluoroacetatocopper (meth)acrylate, propionatomagnesium (meth)acrylate, propionatozinc (meth)acrylate, propionatocopper (meth)acrylate, octylatomagnesium (meth)acrylate, octylatozinc (meth)acrylate, octylatocopper (meth)acrylate, versatatomagnesium (meth)acrylate, versatatozinc (meth)acrylate, versatatocopper (meth)acrylate, isostearatomagnesium (meth)acrylate, isostearatozinc (meth)acrylate, isostearatocopper (meth) acrylate, palmitatomagnesium (meth)acrylate, palmitatozinc (meth)acrylate, palmitatocopper (meth)acrylate, cresotatomagnesium (meth)acrylate, cresotatozinc (meth)acrylate, cresotatocopper (meth)acrylate, α-naphthoatomagnesium (meth)acrylate, α-naphthoatozinc (meth)acrylate, α-naphthoatocopper (meth)acrylate, β-naphthoatomagnesium (meth)acrylate, β-naphthoatozinc (meth)acrylate, β-naphthoatocopper (meth)acrylate, benzoatomagnesium (meth)acrylate, benzoatozinc (meth)acrylate, benzoatocopper (meth)acrylate, 2,4,5-trichlorophenoxyacetatomagnesium (meth)acrylate, 2,4,5-trichlorophenoxyacetatozinc (meth)acrylate, 2,4,5-trichlorophenoxyacetatocopper (meth)acrylate, 2,4-dichlorophenoxyacetatomagnesium (meth)acrylate, 2,4-dichlorophenoxyacetatozinc (meth)acrylate, 2,4-dichlorophenoxyacetatocopper (meth)acrylate, quinolinecarboxylatomagnesium (meth)acrylate, quinolinecarboxylatozinc (meth)acrylate, quinolinecarboxylatocopper (meth)acrylate, nitrobenzoatomagnesium (meth)acrylate, nitrobenzoatozinc (meth)acrylate, nitrobenzoatocopper (meth)acrylate, nitronaphthalenecarboxylatomagnesium (meth)acrylate, nitronaphthalenecarboxylatozinc (meth)acrylate, nitronaphthalenecarboxylatocopper (meth)acrylate, pulvatomagnesium (meth)acrylate, pulvatozinc (meth)acrylate, pulvatocopper (meth)acrylate and the like.

The compounds of the above formula (1) may be those obtained by reacting, as aforementioned, an inorganic metal compound and a carboxylated compound, such as (meth)acrylic acid, in the presence of an alcoholic organic solvent and water, and also may be those obtained by other processes.

These polymerizable unsaturated monomers (a1) containing a metal may be used alone or in combination. In the present invention, it is especially preferred to use the metal di(meth)acrylate (a11) in combination with the metal-containing monomer (a12) of the above formula (1) as the polymerizable unsaturated monomer (a1) containing a metal.

Unsaturated Monomer (a2) Capable of Radical Polymerization Containing No Metals

As the unsaturated monomer (a2) capable of radical polymerization containing no metals that is copolymerized with the above component (a1), use may be made of, for example:

a (meth)acrylic ester monomer, such as methyl (meth)acrylate, ethyl( meth)acrylate, 2-methoxyethyl (meth)acrylate, 2-ethoxyethyl (meth) acrylate, phenoxyethyl (meth)acrylate, 2-(2-ethylhexaoxy)ethyl (meth)acrylate, 1-methyl-2-methoxyethyl (meth)acrylate, 3-methoxybutyl (meth)acrylate, 3-methyl-3-methoxybutyl (meth)acrylate, m-methoxyphenyl (meth)acrylate, p-methoxyphenyl (meth)acrylate, o-methoxyphenylethyl (meth)acrylate, m-methoxyphenylethyl (meth)acrylate, p-methoxyphenylethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, lauryl (meth)acrylate, stearyl (meth)acrylate, benzyl (meth)acrylate, phenyl (meth)acrylate, isobornyl (meth)acrylate, cyclohexyl (meth)acrylate or glycidyl (meth)acrylate;

a hydroxylated monomer, such as 2-hydroxyethyl (meth)acrylate, 2-hydroxypropyl (meth)acrylate, 3-hydroxypropyl (meth)acrylate, 2-hydroxybutyl (meth)acrylate or 4-hydroxybutyl (meth)acrylate;

an addition product from 2-hydroxyethyl (meth)acrylate and ethylene oxide, propylene oxide, γ-butyrolactone, ε-caprolactone or the like;

a dimer or trimer of 2-hydroxyethyl (meth)acrylate, 2-hydroxypropyl (meth)acrylate or the like;

a monomer having multiple hydroxyl groups, such as glycerol (meth)acrylate; a vinyl monomer having a primary or secondary amino group, such as butylaminoethyl (meth)acrylate or (meth)acrylamide;

a vinyl monomer having a tertiary amino group, such as dimethylaminoethyl (meth)acrylate, diethylaminoethyl (meth)acrylate, dimethylaminopropyl (meth)acrylate, dimethylaminobutyl (meth)acrylate, dibutylaminoethyl (meth)acrylate, dimethylaminoethyl (meth)acrylamide or dimethylaminopropyl (meth)acrylamide;

a heterocyclic basic monomer, such as vinylpyrrolidone, vinylpyridine or viylcarbazole; or a vinyl monomer, such as styrene, vinyltoluene, α-methylstyrene, (meth)acrylonitrile, vinyl acetate or vinyl propionate.

Among these unsaturated monomers (a2) capable of radical polymerization containing no metals, preferred use is made of (meth)acrylic acid or (meth)acrylic ester monomers (a21) represented by the formula:

$$R^4OOC\text{—}C(R^3)\text{=}CH_2 \quad (2)$$

wherein $R^3$ represents a hydrogen atom or methyl, and $R^4$ represents an alkyl, a cycloalkyl or an aryl.

Also, the unsaturated monomer (a2) capable of radical polymerization containing no metals for use in the present invention can preferably be monomer (a22) of the formula:

$$R^7R^6OOC\text{—}C(R^5)\text{=}CH_2 \quad (3)$$

(wherein $R^5$ represents a hydrogen atom or methyl, $R^6$ represents an alkylene, a cycloalkylene or an arylene, and $R^7$ represents a hydroxyl, an alkoxyl, a cycloalkoxyl or an aryloxyl.

As the monomer (a22) of the above formula (3), there can be mentioned, for example, 2-methoxyethyl (meth)acrylate, 2-ethoxyethyl (meth)acrylate, phenoxyethyl (meth)acrylate, 2-(2-ethylhexaoxy)ethyl (meth)acrylate, 1-methyl-2-methoxyethyl acrylate, 3-methoxybutyl acrylate, 3-methyl-3-methoxybutyl acrylate, m-methoxyphenyl (meth)acrylate, p-methoxyphenyl (meth)acrylate, o-methoxyphenylethyl (meth)acrylate, m-methoxyphenylethyl (meth)acrylate or p-methoxyphenylethyl (meth)acrylate. At least one of these can appropriately be selected and used. Among these monomers (a22), 2-methoxyethyl acrylate, 3-methoxybutyl acrylate or the like is preferred.

These unsaturated monomers (a2) capable of radical polymerization containing no metals may be used alone or in combination. In the present invention, it is especially preferred to use the monomer (a21) of the above formula (2) in combination with the monomer (a22) of the above formula (3) as the unsaturated monomer (a2) capable of radical polymerization containing no metals.

Metal-containing Copolymer (A)

The metal-containing copolymer (A) for use in the present invention is obtained by copolymerization of the above polymerizable unsaturated monomer (a1) containing a metal with the unsaturated monomer (a2) capable of radical polymerization containing no metals.

Although this metal-containing copolymer (A) is not particularly limited, it is preferably composed of 2 to 50% by weight, still preferably 5 to 40% by weight of units derived from the component (a1) and 50 to 98% by weight, still preferably 60 to 90% by weight of units derived from the unsaturated monomer (a2) capable of radical polymerization containing no metals.

Also, the metal-containing copolymer (A) for use in the present invention is preferably composed of 0.1 to 49.9% by weight, still preferably 1 to 40% by weight of units derived from the metal di(meth)acrylate (a11), 0.1 to 49.9% by weight, still preferably 1 to 40% by weight of units derived from the metal-containing monomer (a12) of the above formula (1) and 50 to 98% by weight, still preferably 60 to 90% by weight of units derived from the unsaturated monomer (a2) capable of radical polymerization containing no metals.

Further, the metal-containing copolymer (A) for use in the present invention is preferably composed of 0.1 to 49.9% by weight, still preferably 1 to 40% by weight of units derived from the metal di(meth)acrylate (a11), 0.1 to 49.9% by weight, still preferably 1 to 40% by weight of units derived from the metal-containing monomer (a12) of the above formula (1), 0.1 to 97.9% by weight of units derived from the monomer (a21) of the above formula (2), and 0.1 to 97.9% by weight, still preferably 1 to 90% by weight of units derived from the monomer (a22) of the above formula (3).

For example, when a polymerizable compound obtained by reacting an inorganic metal compound with (meth)acrylic acid in the presence of an alcoholic organic solvent and water is used as the polymerizable unsaturated monomer (a1) containing a metal, preferably, a mixture of reaction product (a1), organic solvent and water and an unsaturated monomer (a2) capable of radical polymerization containing no metals are subjected to copolymerization in such a weight ratio that 16 to 97 parts by weight, preferably 40 to 90 parts by weight, and still preferably 60 to 80 parts by weight of component (a2) is used per 100 parts by weight of the total of the mixture and component (a2).

The metal-containing copolymer (A) for use in the present invention can preferably be obtained by copolymerization of the copolymerization components in the above ratio. The metal-containing copolymer (A) obtained by carrying out the copolymerization in the above ratio, when formed into a coating film, exhibits appropriate water resistance and satisfactory hydrolyzability for a prolonged period of time and excels in a balance between coating film crack resistance and hydrolyzability.

Although the method of copolymerization for obtaining the metal-containing copolymer (A) is not particularly limited, for example, the metal-containing copolymer (A) can be produced by reacting a mixture of the polymerizable unsaturated monomer (a1) containing a metal and the unsaturated monomer (a2) capable of radical polymerization containing no metals in the presence of a radical initiator at about 60 to 180° C. for about 5 to 14 hr. In this copolymerization reaction, a chain transfer agent can preferably be used. It is preferred to use a chain transfer agent other than mercaptan as this chain transfer agent from the viewpoint of miscibility with the polymerizable unsaturated monomer (a1) containing a metal. For example, a styrene dimer or the like can be used as the chain transfer agent.

With respect to the method of copolymerization, use can be made of the solution polymerization, suspension polymerization, emulsion polymerization, etc. Among these, the solution polymerization conducted with the use of an general organic solvent is preferred from the viewpoint of high productivity.

As the organic solvent, there can be mentioned:
an aromatic hydrocarbon, such as xylene or toluene;
an aliphatic hydrocarbon, such as hexane or heptane;
an ester, such as ethyl acetate or butyl acetate;
an alcohol, such as isopropyl alcohol or butyl alcohol;
an ether, such as dioxane or diethyl ether;
a ketone, such as methyl ethyl ketone or methyl isobutyl ketone; or the like.

It is preferred that the weight average molecular weight (Mw), measured by GPC (gel permeation chromatography), of the metal-containing copolymer (A) for use in the present invention be generally in the range of about 1000 to 20,000, especially 3000 to 10,000. The weight average molecular weight of 20,000 or less is preferred from the viewpoint that the extreme increase of the viscosity of copolymer solution can be prevented and that gelation of the resin by metal crosslinking in the copolymer resin can be prevented. On the other hand, the molecular weight of 1000 or over is preferred from the viewpoint that upon formation of a coating film, it exhibits crack resistance.

Although the amount of metal-containing copolymer (A) in the antifouling coating composition of the present invention is not particularly limited, it can be, for example, in the range of about 15 to 30% by weight, preferably 15 to 25% by weight based on the amount of antifouling coating composition.

(B) 4,5-dichloro-2-n-octyl-4-isothiazolin-3-one

In the present invention, 4,5-dichloro-2-n-octyl-4-isothiazolin-3-one (B) together with the above metal-containing copolymer (A) and the metal pyrithione compound (C) described later constitutes the antifouling coating composition of the present invention. The coating film from this antifouling coating composition can reduce environmental load and can exhibit excellent antifouling performance and excellent adherence to the surface of aging deteriorated coating films.

It is preferred that this component (B) be generally contained in an amount of 0.1 to 40 parts by weight, especially 0.5 to 20 parts by weight per 100 parts by weight of the antifouling coating composition of the present invention. When the component (B) is contained in the above amount in the antifouling coating composition of the present invention, the obtained coating film tends to excel in antifouling performance and also adherence. Per 100 parts by weight of metal-containing copolymer (A), it is preferred that the component (B) be generally contained in an amount of 0.5 to 100 parts by weight, especially 1 to 50 parts by weight from the viewpoint of coating film properties.

(C) Metal Pyrithione Compound

As the metal pyrithione compound (C) for use in the present invention, there can be mentioned compounds of the formula:

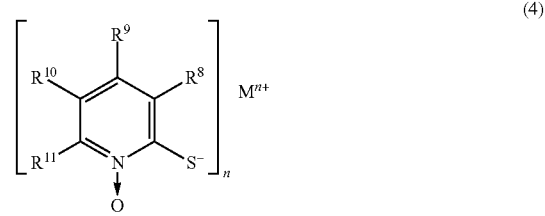

(4)

wherein each of $R^8$ to $R^{11}$ independently represents a hydrogen atom, an alkyl group, an alkoxy group or a halogenated alkyl group.

M can represent a metal such as Cu, Na, Mg, Ca, Ba, Pb, Fe or Al, but it is preferred that M represent Zn from the viewpoint of durability of coating film wasting.

n is the valence of metal M.

The metal pyrithione compounds can be used alone or in combination.

In the present invention, it is preferred that the metal pyrithione compound (C) be generally contained in an amount of 1 to 90 parts by weight, especially 5 to 55 parts by weight per 100 parts by weight of the metal-containing copolymer (A) (solid contents) in the antifouling coating composition of the present invention. When the metal pyrithione compound (C) is contained in the above amount in the antifouling coating composition of the present invention, there is such a tendency that an antifouling coating film excelling in antifouling performance can be obtained.

Further, it is preferred that this metal pyrithione compound (C) be contained in an amount of 0.2 to 40 parts by weight, especially 1 to 20 parts by weight per 100 parts by weight of the antifouling coating composition of the present invention. When the metal pyrithione compound (C) is contained in the above amount in the antifouling coating composition of the present invention, the obtained coating film tends to excel in antifouling performance.

The metal pyrithione compound (C), different from cuprous oxide, exhibits reduced environmental load. The antifouling coating composition resulting from combination of this metal pyrithione compound (C) with 4,5-dichloro-2-n-octyl-4-isothiazolin-3-one (B) excels in the penetrability into a substrate to be coated. The thus obtained coating film excels in the long-term antifouling performance maintaining capability and the long-term coating film uniform wastability, so that it can be appropriately applied to long-term continuous uses such as ocean-going vessels. Further, the coating film is resistant to cracking and peeling, and the coating film formed is one having high adherence as compared with that realized in the use of pyridine-triphenylborane or the like. Thus, the antifouling coating composition is suitable as an antifouling paint for marine vessels and underwater structures or as an antifouling paint for fishing gear or fishing net.

Optional Components

In addition to the above essential components consisting of metal-containing copolymer (A), 4,5-dichloro-2-n-octyl-4-isothiazolin-3-one (B) and metal pyrithione compound (C), the antifouling coating composition of the present invention may be optionally loaded with various components as commonly mixed in antifouling paints, for example, plasticizers such as chlorinated paraffin, color pigments such as zinc oxide (zinc flower) (D), extenders such as talc (E), inorganic dehydrating agents, antifoulants, especially organic antifoulants (F) other than the above items (A) to (C), plasticizers, antisagging/antisetting agents, coating film forming components other than the above copolymer (A), solvents, etc.

<Color Pigment>

As the color pigment, use can be made of various common organic and inorganic pigments.

Examples of the organic pigments include carbon black, Phthalocyanine Blue, Prussian Blue and the like.

Examples of the inorganic pigments include those which are neutral and nonreactive, such as titanium white, red iron oxide, baryta powder, chalk and iron oxide powder; and those (active pigments) which are basic and react with acidic substances in the paint, such as zinc flower (ZnO, zinc oxide), white lead, red lead, zinc powder and lead suboxide powder.

Dyes and other various colorants may be contained in the pigments.

In particular, zinc oxide (D) is preferably used. When it is intended to add zinc oxide (D), it is preferred that zinc oxide be added generally in an amount of 5 to 100 parts by weight per 100 parts by weight of metal-containing copolymer (A) and 0.1 to 40% by weight based on the amount of antifouling coating composition from the viewpoint of wasting durability and adherence of obtained coating film.

<Extender (E)>

The extender (E) is a pigment which exhibits low refractive index and which when blended with an oil or a varnish, is transparent and does not mask a coating surface. As the extender, there can be mentioned, for example, talc, silica, mica or clay; also used as an antisetting agent, calcium carbonate, kaolin or alumina white; also used as a flatting agent, white carbon, aluminum hydroxide, magnesium carbonate, barium carbonate or barium sulfate; bentonite also used as an antisetting agent; or the like. Among these, talc, silica, mica, clay, calcium carbonate and kaolin are preferred.

These extenders (E) can be used alone or in combination. The level of wasting can be regulated by the type of extender employed.

Taking into account the cost reduction and buildup effect for obtained paint and the transparency and thickness level for obtained coating film, the extender may generally be contained in the antifouling coating composition in an amount of 0 to 50% by weight, preferably 0 to 30% by weight.

<Inorganic Dehydrating Agent (Stabilizer)>

The inorganic dehydrating agent (stabilizer) enables enhancing the storage stability of the final antifouling coating composition. Examples of the inorganic dehydrating agents include anhydrous gypsum ($CaSO_4$), synthetic zeolite adsorbents (trade name: Molecular Sieve, etc.), orthoesters such as methyl orthoformate and methyl orthoacetate, orthoboric esters, silicates, isocyanates (trade name: Additive TI) and the like. Of these, anhydrous gypsum and Molecular Sieve are preferably used. These inorganic dehydrating agents can be used alone or in combination.

<Other Organic Antifoulant (F)>

The antifouling coating composition may contain, as the antifoulant, those other than the above metal-containing copolymer (A), 4,5-dichloro-2-n-octyl-4-isothiazolin-3-one (B) and metal pyrithione compound (C), especially organic antifoulants (F).

Examples of the organic antifoulants (F) include tetramethylthiuram disulfide, carbamate poisons (e.g., zinc dimethyldithiocarbamate and manganese 2-ethylenebisdithiocarbamate), 2,4,5,6-tetrachloroisophthalonitrile, N,N-dimethyldichlorophenylurea, 2,4,6-trichlorophenylmaleimide, 2-methylthio-4-t-butylamino-6-cyclopropylamino-s-triazin e, basic copper acetate and the like.

These other organic antifoulants (F) can be used generally in such an amount that the sum of antifoulants (B)+(C)+(F) is in the range of 1 to 70% by weight, preferably 5 to 50% by weight based on the amount of antifouling coating composition.

In the present invention, it is preferred that substantially none of borane compounds, such as pyridine-triphenylborane and other triphenylborane compounds and tetraphenylborane compounds, described in Japanese Patent Publication No. 54(1979)-1571 and none of cuprous oxide as inorganic antifoulant are contained in the antifouling coating composition.

<Plasticizer (Chlorinated Paraffin)>

Examples of the plasticizers include TCP (tricresyl phosphate), chlorinated paraffin, polyvinyl ethyl ether and the like. These plasticizers can be used alone or in combination.

These plasticizers contribute to enhancement of the crack resistance of the coating film from obtained antifouling coating composition (herein also referred to as "antifouling coating film"). Among the plasticizers, chlorinated paraffin (chloroparaffin) is preferably used.

The chlorinated paraffin (chloroparaffin) may be linear or branched. The chlorinated paraffin at room temperature may be liquid or solid (powdery). The average number of carbon atoms thereof is generally in the range of 8 to 30, preferably 10 to 26. It is preferred to use a chlorinated paraffin having a number average molecular weight of generally 200 to 1200, especially 300 to 1100, a viscosity of generally 1 or higher (poise/25° C.), especially 1.2 or higher (poise/25° C.) and a specific gravity of 1.05 to 1.80/25° C., especially 1.10 to 1.70/25° C. When the chlorinated paraffin of the above number of carbon atoms is used, the obtained antifouling coating composition enables forming a coating film that is resistant to cracking and peeling. When the number of carbon atoms of chlorinated paraffin is less than 8, the crack inhibiting effect may be unsatisfactory. On the other hand, when the number of carbon atoms of chlorinated paraffin exceeds 30, the surface of obtained coating film may exhibit poor wasting performance (renewability) and poor antifouling performance. It is preferred that the chlorination ratio (chlorine content) of chlorinated paraffin be generally in the range of 35 to 75%, especially 35 to 65%. When the chlorinated paraffin of this chlorination ratio is used, the obtained antifouling coating composition enables forming a coating film that is resistant to cracking and peeling. As such a chlorinated paraffin, there can be mentioned, for example, "Toyoparax 150" or "Toyoparax A-70" produced by Tosoh Corporation.

<Antisagging/Antisetting Agent (Thixotropic Agent)>

The antisagging/antisetting agent (thixotropic agent) may be added to the antifouling coating composition in an arbitrary amount unless it is not one detrimental to the storage stability of the antifouling coating composition, such as an organic clay. Examples of the antisagging/antisetting agents include organic clay salts such as stearate, lecithinate, alkylsulfonate salts of Al, Ca and Zn, and further include polyethylene wax, amide wax, hydrogenated castor oil wax, polyamide wax, a mixture of hydrogenated castor oil wax and polyamide wax, synthetic particulate silica and polyethylene oxide wax. Of these, polyamide wax, synthetic particulate silica, polyethylene oxide wax and organic clay salts are preferably employed. As the antisagging/antisetting agents, use can also be made of those commercially available, for example, by the trade names "Disparlon 305", "Disparlon 4200-20" and "Disparlon A632-20X", all products of Kusumoto Chemicals, Ltd.

<Other Coating Film Forming Component>

The antifouling coating composition of the present invention may contain, as coating film forming components, resins other than the above metal-containing copolymer (A) as long as these are not detrimental to the object of the present invention. Examples of these "other coating film forming components" include sparingly water-soluble or non-water-soluble resins (hereinafter also referred to as "sparingly/non-water-soluble resins"), such as an acrylic resin, an acrylic silicone resin, unsaturated polyester resins, a fluororesin, a polybutene resin, a silicone rubber, a urethane resin (rubber), polyamide resins, vinyl chloride copolymer resins, a chlorinated rubber (resin), chlorinated olefin resins, a styrene/butadiene copolymer resin, an ethylene/vinyl acetate copolymer resin, a vinyl chloride resin, an alkyd resin, a cumarone resin, a petroleum resin and the like.

In particular, specific examples of the above vinyl chloride copolymer resins include a vinyl chloride/vinyl acetate copolymer resin, a vinyl chloride/vinyl acetate/vinyl alcohol copolymer resin, a vinyl chloride/vinyl i-butyl ether copolymer resin, a vinyl chloride/vinyl propionate copolymer resin and a chloride of ethylene/vinyl acetate copolymer.

In the present invention, these resins and rubbers can be used alone or in combination. In the present invention, the above sparingly/non-water-soluble resins can be used in combination with the following water soluble resins.

Examples of the water soluble resins include rosin (e.g., trade name "rosin WW"), a monocarboxylic acid and salts thereof. As the monocarboxylic acid, there can be mentioned, for example, a naphthenic acid or fatty acid having about 9 to 19 carbon atoms. Examples of the salts of monocarboxylic acids include Cu, Zn and Ca salts. Examples of the rosins include gum rosin, wood rosin, tall oil rosin and the like. These without exception can be used in the present invention. These water soluble resins can be used alone or in combination.

<Solvent>

In the antifouling coating composition of the present invention, the above various components are dissolved or dispersed in solvents. Use can be made of various solvents commonly added to antifouling paints, such as aliphatic, aromatic, ketonic, ester and ether solvents. Examples of the aromatic solvents include xylene and toluene. Examples of the ketonic solvents include MIBK. Examples of the ether solvents include propylene glycol monomethyl ether and propylene glycol monomethyl ether acetate (PMAC).

Production of Antifouling Coating Composition

The antifouling coating composition of the present invention can be produced from the above metal-containing copolymer (A), 4,5-dichloro-2-n-octyl-4-isothiazolin-3-one (B) and metal pyrithione compound (C) together with optional components according to necessity by the appropriate use of common methods. For example, the production can be performed by adding in given proportion simultaneously or in arbitrary sequence, agitating/mixing and dispersing in a solvent the metal-containing copolymer (A), 4,5-dichloro-2-n-octyl-4-isothiazolin-3-one (B) and metal pyrithione compound (C) together with, used according to necessity, a color pigment, especially extender (E) such as zinc oxide (D), talc, silica, mica, clay, calcium carbonate or kaolin, an inorganic dehydrating agent (stabilizer), an antifoulant, especially organic antifoulant (F), a plasticizer, an antisagging/antisetting agent, other coating film forming components, a solvent (e.g., xylene), etc.

The antifouling coating composition of the present invention can be applied to the surface of various shaped items such as underwater structures, for example, supply water inlets and waste water outlets for thermal power plants and nuclear power plants; sludge diffusion preventive membranes for use in various marine civil engineering works such as coastal roads, undersea tunnels, harbor facilities, canals and waterways; and marine vessels and fishing materials (e.g., rope, fishing net, fishing gear, float and buoy) once or multiple times according to the customary technique. As a result, there can be obtained, for example, marine vessels and underwater structures covered with antifouling coating film which is excellent in antifouling properties and can slowly release antifoulant components for a prolonged period of time and which, despite the thick coating, has appropriate flexibility and is excellent in crack resistance.

The antifouling coating film obtained by applying the above antifouling coating composition of the present invention to the surface of various shaped items and hardening the same is excellent in antifouling properties and, for example, can continuously inhibit attachment of aquatic organisms such as sea lettuces, barnacles, green lavers, serpulas, oysters and *Bugula* for a prolonged period of time.

In particular, when the materials for marine vessels, etc. are FRP, steel, wood, an aluminum alloy and the like, the antifouling coating composition satisfactorily adheres to the surface of these materials. With respect to a steel boat or an aluminum boat, the application of the antifouling coating composition of the present invention is generally carried out to a substrate surface having been sequentially coated with a primer, an anticorrosive paint and, according to necessity, a binder paint. Further, this antifouling coating composition may be applied as an overcoat to the surface of any existing antifouling coating films.

Moreover, for example, the application of the antifouling coating composition to the surface of undersea structures enables inhibiting the attachment of sea lives so that the capability of the undersea structures can be maintained for a prolonged period of time. The application of the antifouling coating composition to the surface of fishing nets enables avoiding the clogging of the meshes of the fishing nets while lessening the danger of environmental pollution.

The antifouling coating composition of the present invention may be directly applied to fishing nets, or may be applied to the surface of marine vessels, underwater structures and the like which has been furnished with an undercoat such as a rust preventive agent or a primer. Furthermore, the antifouling coating composition of the present invention may be applied as an overcoat for repair to the surface of marine vessels, especially FRP ships, underwater structures and the like which has already been coated with conventional antifouling paints or the antifouling coating composition of the present invention. The thickness of the antifouling coating film thus formed on the surface of the marine vessels, underwater structures and the like, although not particularly limited, is, for example, in the range of about 30 to 150 µm per application.

The thus obtained antifouling coating film, or coating film on the surface of parts of marine vessels and underwater structures brought into contact with water, according to the present invention is formed from the above antifouling coating composition, lessens the danger of environmental pollution and excels in the long-term antifouling capability against a wide variety of organisms which attach to marine vessels and underwater structures.

According to the present invention, there can be obtained an antifouling coating composition of wide applicability enabling even production of a white antifouling paint, which antifouling coating composition is capable of forming an antifouling coating film excelling in long-term antifouling performance and exhibiting various excellent characteristics, such as realizing of excellent antifouling activity while reducing burdens on the environment, uniform wasting of coating film at constant rate for a prolonged period of time so as to excel in the uniform wastability of coating film, maintaining of excellent antifouling performance for a prolonged period of time so as to excel in the long-term antifouling capability maintaining performance of coating film, being suitable to ocean-going vessels, resistance to cracking and peeling, increased adhesion as compared with that of a coating film based on pyridine-triphenylborane, etc., sharp hue and reducing of discoloration after water immersion or exposure. Furthermore, there can be provided an antifouling coating film formed from the antifouling coating composition and, covered with the antifouling coating film, a marine vessel, underwater structure, fishing gear or fishing net.

When the surface of coating substrate, such as a marine vessel, a marine structure at its part immersed in water, a fishing gear or a fishing net is coated/impregnated with the antifouling coating composition of the present invention and a coating film is formed on the surface, the fouling and damaging thereof can be reduced to a striking extent, and the service life thereof can be strikingly extended. In the use of antifouling coating composition loaded with a color pigment, a coating film of sharp hue can be obtained.

The antifouling coating composition of the present invention is soluble in organic solvents, so that it excels in applicability to fishing nets, etc.

The marine vessel, underwater structure, fishing gear and fishing net according to the present invention are obtained with the use of the antifouling coating composition of the present invention, and exert excellent antifouling performance over a prolonged period of time.

EXAMPLE

The present invention will further be illustrated below with reference to the following Examples, which however in no way limit the scope of the invention.

In the following Examples and Comparative Examples, parts refer to parts by weight.

Production Example 1

(Production of Metal-containing Monomer a1-1)

In a four-necked flask equipped with a condenser, a thermometer, a dropping funnel and an agitator, 85.4 parts of propylene glycol methyl ether (PGM) and 40.7 parts of zinc oxide were charged and heated to 75° C. under agitation. From the dropping funnel, a mixture of 43.1 parts or methacrylic acid (MAA), 36.1 parts of acrylic acid (AA) and 5 parts of water was dropped at a constant rate over a period of 3 hr. Upon the completion of dropping, the reaction solution turned from milky white to transparency. Further, agitation was carried out for 2 hr, and 36 parts of propylene glycol methyl ether was added, thereby obtaining transparent mixture solution (A) containing metal-containing monomer a1-1. The amount of solid contents (metal-containing monomer a1-1) in the obtained mixture solution was 44.8 wt. %.

Production Example 2

(Production of Metal-Containing Monomer a1-2)

In a four-necked flask equipped with a condenser, a thermometer, a dropping funnel and an agitator, 24.3 parts of n-butanol (nBuOH), 61.1 parts of xylene and 40.7 parts of zinc oxide were charged and heated to 75° C. under agitation. From the dropping funnel, a mixture of 43.1 parts of methacrylic acid, 36.1 parts of acrylic acid and 5 parts of water was dropped at a constant rate over a period of 3 hr. Upon the completion of dropping, the reaction solution turned from milky white to transparency. Further, agitation was carried out for 2 hr, and 36 parts of xylene was added, thereby obtaining transparent mixture solution (B) containing metal-containing monomer a1-2. The amount of solid contents (metal-containing monomer a1-2) in the obtained mixture solution was 44.9 wt. %.

Production Example 3

(Production of Metal-Containing Monomer a1-3)

In a four-necked flask equipped with a condenser, a thermometer, a dropping funnel and an agitator, 85.4 parts of propylene glycol methyl ether and 46.8 parts of zinc oxide were charged and heated to 75° C. under agitation. From the dropping funnel, a mixture of 46.1 parts of methacrylic acid, 36.1 parts of acrylic acid and 5 parts of water was dropped at a constant rate over a period of 3 hr. Upon the completion of dropping, the reaction solution turned from milky white to semitransparency. Further, agitation was carried out for 4 hr, and 43.5 parts of propylene glycol methyl ether was added, thereby obtaining slightly turbid mixture solution (C) containing metal-containing monomer a1-3. The amount of solid contents (metal-containing monomer a1-3) in the obtained mixture solution was 44.9%.

Production Example 4

(Production of Metal-Containing Monomer a1-4)

In a four-necked flask equipped with a condenser, a thermometer, a dropping funnel and an agitator, 70 parts of propylene glycol methyl ether, 15.4 parts of water and 40.7 parts of zinc oxide were charged and heated to 75° C. under agitation. From the dropping funnel, a mixture of 43.1 parts of methacrylic acid, 36.1 parts of acrylic acid and 20.6 parts of water was dropped at a constant rate over a period of 3 hr. Upon the completion of dropping, the reaction solution turned from milky white to transparency. Further, agitation was carried out for 2 hr, and 20.4 parts of propylene glycol methyl ether was added, thereby obtaining transparent mixture solution (D) containing metal-containing monomer a1-4. The amount of solid contents (metal-containing monomer a1-4) in the obtained mixture solution was 44.2%.

Production Example 5

(Production of Metal-Containing Monomer a1-5)

In a four-necked flask equipped with a condenser, a thermometer, a dropping funnel and an agitator, 85.4 parts of propylene glycol methyl ether and 20.2 parts of magnesium oxide were charged and heated to 75° C. under agitation. From the dropping funnel, a mixture of 43.1 parts of methacrylic acid, 36.1 parts of acrylic acid and 5 parts of water was dropped at a constant rate over a period of 3 hr. Upon the completion of dropping, the reaction solution turned from milky white to transparency. Further, agitation was carried out for 2 hr, and 11 parts of propylene glycol methyl ether was added, thereby obtaining transparent mixture solution (E) containing metal-containing monomer a1-5. The amount of solid contents (metal-containing monomer a1-5) in the obtained mixture solution was 44.6%.

Production Example 6

(Production of Metal-Containing Monomer a1-6)

In a four-necked flask equipped with a condenser, a thermometer, a dropping funnel and an agitator, 85.4 parts of propylene glycol methyl ether, 40.5 parts of zinc oxide and 0.2 part of cupric oxide were charged and heated to 75° C. under agitation. From the dropping funnel, a mixture of 43.1 parts of methacrylic acid, 36.1 parts of acrylic acid and 5 parts of water was dropped at a constant rate over a period of 3 hr. Upon the completion of dropping, the reaction solution turned green. Further, agitation was carried out for 2 hr, and 11 parts of propylene glycol methyl ether was added, thereby obtaining transparent mixture solution (F) containing metal-containing monomer a1-6. The amount of solid contents (metal-containing monomer a1-6) in the obtained mixture solution was 44.9%.

Production Example 7

(Production of Metal-Containing Copolymer A-1)

In a four-necked flask equipped with a condenser, a thermometer, a dropping funnel and an agitator, 15 parts of propylene glycol methyl ether, 57 parts of xylene and 4 parts of ethyl acrylate were charged and heated to 100° C. under agitation. From the dropping funnel, a transparent mixture consisting of 1 part of methyl methacrylate, 66.2 parts of ethyl acrylate, 5.4 parts of 2-methoxyethyl acrylate, 52 parts of the mixture solution (A) obtained in Production Example 1, 10 parts of xylene, 1 part of chain transfer agent (Nofmer MSD produced by Nippon Oil & Fats Co., Ltd.), 2.5 parts of AIBN (azobisisobutyronitrile produced by Japan Hydrazine Company, Inc.) and 7 parts of AMBN (azobismethylbutyronitrile produced by Japan Hydrazine Company, Inc.) was dropped at a constant rate over a period of 6 hr. After the completion of dropping, 0.5 part of t-butyl peroctoate and 7 parts of xylene were further dropped over a period of 30 min. Further, agitation was carried out for 1 hr 30 min, and 4.4 parts of xylene was added. Thus, there was obtained a light-yellow transparent resin composition of 45.6% heating residue and Gardner viscosity-Y not containing any insoluble matter and containing metal-containing copolymer A-1.

Production Example 8

(Production of Metal-Containing Copolymer A-2)

In a four-necked flask equipped with a condenser, a thermometer, a dropping funnel and an agitator, 15 parts of propylene glycol methyl ether, 60 parts of xylene and 4 parts of ethyl acrylate were charged and heated to 100° C. under agitation. From the dropping funnel, a transparent mixture consisting of 10 parts of methyl methacrylate, 62.6 parts of ethyl acrylate, 5.4 parts of 2-methoxyethyl acrylate, 40 parts of the mixture solution (A) obtained in Production Example 1, 10 parts of xylene, 1 part of chain transfer agent (Nofmer MSD produced by Nippon Oil & Fats Co., Ltd.), 2.5 parts of AIBN and 5.5 parts of AMBN was dropped at a constant rate over a period of 6 hr. After the completion of dropping, 0.5 part of t-butyl peroctoate and 7 parts of xylene were further dropped over a period of 30 min. Further, agitation was carried out for 1 hr 30 min, and 8 parts of xylene was added. Thus, there was obtained a light-yellow transparent resin composition of 46.1% heating residue and Gardner viscosity+V not containing any insoluble matter and containing metal-containing copolymer A-2.

Production Example 9

(Production of Metal-Containing Copolymer A-3)

In a four-necked flask equipped with a condenser, a thermometer, a dropping funnel and an agitator, 15 parts of propylene glycol methyl ether, 57 parts of xylene and 4 parts of ethyl acrylate were charged and heated to 100° C. under agitation. From the dropping funnel, a transparent mixture consisting of 14.6 parts of methyl methacrylate, 52.6 parts of ethyl acrylate, 7.5 parts of n-butyl acrylate, 47.4 parts of the mixture solution (A) obtained in Production Example 1, 10 parts of xylene, 1 part of chain transfer agent (Nofmer MSD produced by Nippon Oil & Fats Co., Ltd.), 2.5 parts of AIBN and 8.5 parts of AMBN was dropped at a constant rate over a period of 6 hr. After the completion of dropping, 0.5 part of t-butyl peroctoate and 7 parts of xylene were further dropped over a period of 30 min. Further, agitation was carried out for 1 hr 30 min, and 6.9 parts of xylene was added. Thus, there was obtained a light-yellow transparent resin composition of 45.8% heating residue and Gardner viscosity–Z2 not containing any insoluble matter and containing metal-containing copolymer A-3.

Production Example 10

(Production of Metal-Containing Copolymer A-4)
In a four-necked flask equipped with a condenser, a thermometer, a dropping funnel and an agitator, 15 parts of propylene glycol methyl ether, 61 parts of xylene and 4 parts of ethyl acrylate were charged and heated to 100° C. under agitation. From the dropping funnel, a transparent mixture consisting of 18 parts of methyl methacrylate, 61 parts of ethyl acrylate, 37.8 parts of the mixture solution (A) obtained in Production Example 1, 10 parts of xylene, 1 part of chain transfer agent (Nofmer MSD produced by Nippon Oil & Fats Co., Ltd.), 2.5 parts of AIBN and 7 parts of AMBN was dropped at a constant rate over a period of 6 hr. After the completion of dropping, 0.5 part of t-butyl peroctoate and 7 parts of xylene were further dropped over a period of 30 min. Further, agitation was carried out for 1 hr 30 min, and 8.2 parts of xylene was added. Thus, there was obtained a light-yellow transparent resin composition of 46.0% heating residue and Gardner viscosity+T not containing any insoluble matter and containing metal-containing copolymer A-4.

Production Example 11

(Production of Metal-Containing Copolymer A-5)
In a four-necked flask equipped with a condenser, a thermometer, a dropping funnel and an agitator, 15 parts of propylene glycol methyl ether, 57 parts of xylene and 4 parts of ethyl acrylate were charged and heated to 100° C. under agitation. From the dropping funnel, a transparent mixture consisting of 5 parts of methyl methacrylate, 64.9 parts of ethyl acrylate, 5.4 parts of 2-methoxyethyl acrylate, 40 parts of the mixture solution (A) obtained in Production Example 1, 6 parts of the mixture solution (E) obtained in Production Example 5, 10 parts of xylene, 1 part of chain transfer agent (Nofmer MSD produced by Nippon Oil & Fats Co., Ltd.), 2.5 parts of AIBN and 6 parts of AMBN was dropped at a constant rate over a period of 6 hr. After the completion of dropping, 0.5 part of t-butyl peroctoate and 7 parts or xylene were further dropped over a period of 30 min. Further, agitation was carried out for 1 hr 30 min, and 7.7 parts of xylene was added. Thus, there was obtained a light-yellow transparent resin composition of 46.2% heating residue and Gardner viscosity+U not containing any insoluble matter and containing metal-containing copolymer A-5.

Production Example 12

(Production of Metal-Containing Copolymer A-6)
In a four-necked flask equipped with a condenser, a thermometer, a dropping funnel and an agitator, 15 parts of propylene glycol methyl ether, 57 parts of xylene and 4 parts of ethyl acrylate were charged and heated to 100° C. under agitation. From the dropping funnel, a green mixture consisting of 1 part of methyl methacrylate, 66.2 parts of ethyl acrylate, 5.4 parts of 2-methoxyethyl acrylate, 52 parts of the mixture solution (F) obtained in Production Example 6, 10 parts of xylene, 1 part of chain transfer agent (Nofmer MSD produced by Nippon Oil & Fats Co., Ltd.), 2.5 parts of AIBN and 7 parts of AMBN was dropped at a constant rate over a period of 6 hr. After the completion of dropping, 0.5 part of t-butyl peroctoate and 7 parts of xylene were further dropped over a period of 30 min. Further, agitation was carried out for 1 hr 30 min, and 4.4 parts of xylene was added. Thus, there was obtained a green resin composition of 45.2% heating residue and Gardner viscosity+V not containing any insoluble matter and containing metal-containing copolymer A-6.

Production Example 13

(Production of Metal-Containing Copolymer A-7)
In a four-necked flask equipped with a condenser, a thermometer, a dropping funnel and an agitator, 15 parts of propylene glycol methyl ether and 61 parts of xylene were charged and heated to 100° C. under agitation. From the dropping funnel, a transparent mixture consisting of 49.55 parts of methyl methacrylate, 50 parts of ethyl acrylate, 1 part of the mixture solution (A) obtained in Production Example 1, 2.5 parts of AIBN and 2 parts of AMBN was dropped at a constant rate over a period of 4 hr. After the completion of dropping, 0.5 part of t-butyl peroctoate and 7 parts of xylene were further dropped over a period of 30 min. Further, agitation was carried out for 1 hr 30 min, and 38.45 parts of xylene was added. Thus, there was obtained a transparent resin composition of 44.7% heating residue and Gardner viscosity+B not containing any insoluble matter and containing metal-containing copolymer A-7.

Production Example 14

(Production of Metal-Containing Copolymer A-8)
In a four-necked flask equipped with a condenser, a thermometer, a dropping funnel and an agitator, 15 parts of propylene glycol methyl ether, 61 parts of xylene and 4 parts of ethyl acrylate were charged and heated to 100° C. under agitation. From the dropping funnel, a transparent mixture consisting of 18 parts of methyl methacrylate, 61 parts of ethyl acrylate, 37.8 parts of the mixture solution (B) obtained in Production Example 2, 10 parts of xylene, 1 part of chain transfer agent (Nofmer MSD produced by Nippon Oil & Fats Co., Ltd.), 2.5 parts of AIBN and 7 parts of AMBN was dropped at a constant rate over a period of 6 hr. After the completion of dropping, 0.5 part of t-butyl peroctoate and 7 parts of xylene were further dropped over a period of 30 min. Further, agitation was carried out for 1 hr 30 min, and 8.2 parts of xylene was added. Thus, there was obtained a light-yellow transparent resin composition of 46.2% heating residue and Gardner viscosity+Y not containing any insoluble matter and containing metal-containing copolymer A-8.

Production Example 15

(Production of Metal-Containing Copolymer A-9)
In a four-necked flask equipped with a condenser, a thermometer, a dropping funnel and an agitator, 15 parts of propylene glycol methyl ether, 57 parts of xylene and 4 parts of ethyl acrylate were charged and heated to 100° C. under agitation. From the dropping funnel, a transparent mixture consisting of 1 part of methyl methacrylate, 64.9 parts of ethyl acrylate, 5.4 parts of 2-methoxyethyl acrylate, 55 parts of the mixture solution (C) obtained in Production Example 3, 10 parts of xylene, 1 part of chain transfer agent (Nofmer MSD produced by Nippon Oil & Fats Co., Ltd.), 2.5 parts of AIBN and 7.5 parts of AMBN was dropped at a constant rate over a period of 6 hr. After the completion of dropping, 0.5 part of t-butyl peroctoate and 7 parts of xylene were further dropped over a period of 30 min. Further, agitation was carried out for 1 hr 30 min, and 3.1 parts of xylene was added. Thus, there was obtained a slightly turbid light-yellow resin composition of 46.3% heating residue and Gardner viscosity+W not containing any insoluble matter and containing metal-containing copolymer A-9.

Production Example 16

(Production of Metal-Containing Copolymer A-10)

In a four-necked flask equipped with a condenser, a thermometer, a dropping funnel and an agitator, 46.8 parts of propylene glycol methyl ether, 25.2 parts of xylene and 4 parts of ethyl acrylate were charged and heated to 90° C. under agitation. From the dropping funnel, a transparent mixture consisting of 1 part of methyl methacrylate, 66.2 parts or ethyl acrylate, 5.4 parts of 2-methoxyethyl acrylate, 52 parts of the mixture solution (D) obtained in Production Example 4, 10 parts of propylene glycol methyl ether, 1 part of chain transfer agent (Nofmer MSD produced by Nippon Oil & Fats Co., Ltd.), 2.5 parts of AIBN and 8 parts of AMBN was dropped at a constant rate over a period of 6 hr. After the completion of dropping, 0.5 part of t-butyl peroctoate and 7 parts of xylene were further dropped over a period of 30 min and heated to 100° C. Further, agitation was carried out for 1 hr, and 4.4 parts of xylene was added. Thus, there was obtained a slightly turbid light-yellow resin composition of 45.9% heating residue and Gardner viscosity+V not containing any insoluble matter and containing metal-containing copolymer A-10.

Table 1 lists, with respect to Production Examples 1 to 6, the charged amounts (molar ratio) for obtaining reaction products and the solvent amounts, water contents (wt. %) and solid contents of mixture solutions containing reaction products.

Table 2 lists, with respect to Production Examples 7 to 16, the charged amounts (weight ratio) for producing metal-containing copolymers and the viscosities (Gardner viscosity), solid contents (%) and resin molecular weights (MW) of obtained resin compositions.

The molecular weight of each of the resins was measured by the use of HLC-8120 GPC wherein use was made of two separation columns of TSK-gel α type (α-M) and further, as an eluent, DMF (dimethylformamide) containing 20 mM LiBr. The weight average molecular weight was determined in terms of polystyrene.

TABLE 1

| | Charged amt. (mol ratio) | | | | | Volatile component content of metal-contg. monomer mixture (mass %) | | | | Solid cont. (%) |
|---|---|---|---|---|---|---|---|---|---|---|
| | MAA | AA | ZnO | MgO | CuO | water | PGM | n-BuOH | xylene | water | |
| Prod. Ex. 1 | 0.5 | 0.5 | 0.5 | | | 0.27 | 49.3 | — | — | 2.0 | 44.8 |
| Prod. Ex. 2 | 0.5 | 0.5 | 0.5 | | | 0.27 | — | 9.9 | 39.4 | 2.0 | 44.9 |
| Prod. Ex. 3 | 0.5 | 0.5 | 0.575 | | | 0.27 | 49.6 | — | — | 1.9 | 44.9 |
| Prod. Ex. 4 | 0.5 | 0.5 | 0.5 | | | 2.0 | 25.7 | — | — | 14.6 | 44.2 |
| Prod. Ex. 5 | 0.5 | 0.5 | | 0.5 | | 0.27 | 48.0 | — | — | 2.5 | 44.6 |
| Prod. Ex. 6 | 0.5 | 0.5 | 0.4975 | | 0.0025 | 0.27 | 49.3 | — | — | 2.0 | 44.9 |

MAA: methacrylic acid
AA: acrylic acid
PGM: propylene glycol methyl ether

TABLE 2

| | | Prod. Ex. 7 | Prod. Ex. 8 | Prod. Ex. 9 | Prod. Ex. 10 | Prod. Ex. 11 | Prod. Ex. 12 | Prod. Ex. 13 | Prod. Ex. 14 | Prod. Ex. 15 | Prod. Ex. 16 |
|---|---|---|---|---|---|---|---|---|---|---|---|
| Metal-contg. polymer | | A-1 | A-2 | A-3 | A-4 | A-5 | A-6 | A-7 | A-8 | A-9 | A-10 |
| Metal-contg. reaction product mixture soln. | A(Prod. Ex. 1) | 52 | 40 | 47.4 | 37.8 | 40 | | 1 | | | |
| | B(Prod. Ex. 2) | | | | | | | | 37.8 | | |
| | C(Prod. Ex. 3) | | | | | | | | | 55 | |
| | D(Prod. Ex. 4) | | | | | | | | | | 52 |
| | E(Prod. Ex. 5) | | | | | 6 | | | | | |
| | F(Prod. Ex. 6) | | | | | | 52 | | | | |
| Copolymn. monomer | MMA | 1 | 10 | 14.6 | 18 | 5 | 1 | 49.55 | 18 | 1 | 1 |
| | EA | 70.2 | 66.6 | 56.6 | 65 | 68.9 | 70.2 | 50 | 65 | 68.9 | 70.2 |
| | 2-MTA | 5.4 | 5.4 | | | 5.4 | 5.4 | | | 5.4 | 5.4 |
| | nBA | | | 7.5 | | | | | | | |
| Initiator | AIBN | 2.5 | 2.5 | 2.5 | 2.5 | 2.5 | 2.5 | 2.5 | 2.5 | 2.5 | 2.5 |
| | AMBN | 7 | 5.5 | 8.5 | 7 | 6 | 7 | 2 | 7 | 7.5 | 8 |

TABLE 2-continued

|  |  | Prod. Ex. 7 | Prod. Ex. 8 | Prod. Ex. 9 | Prod. Ex. 10 | Prod. Ex. 11 | Prod. Ex. 12 | Prod. Ex. 13 | Prod. Ex. 14 | Prod. Ex. 15 | Prod. Ex. 16 |
|---|---|---|---|---|---|---|---|---|---|---|---|
| Chain transfer agent | Nofmer MSD | 1 | 1 | 1 | 1 | 1 | 1 |  | 1 | 1 | 1 |
| Properties | Gardner viscosity | −Y | +V | −Z2 | +T | +U | +V | +B | +Y | +W | +V |
|  | solid cont. (%) | 45.6 | 46.1 | 45.8 | 46.0 | 46.5 | 45.2 | 44.7 | 46.2 | 46.3 | 45.9 |
|  | mol. wt. (Mw) | 5200 | 6000 | 4800 | 5000 | 5500 | 5200 | 8000 | 5600 | 5000 | 4200 |

MMA: methyl methacrylate
EA: ethyl acrylate
2-MTA: 2-methoxyethyl acrylate
nBA: n-butyl acrylate
AIBN: azobisisobutyronitrile
AMBN: azobismethylbutyronitrile Production Examples 17 to 29

(Production of Metal-Containing Copolymers A-11 to A-23)

In a four-necked flask equipped with a condenser, a thermometer, a dropping funnel and an agitator, 30 parts of PGM (propylene glycol methyl ether) and 40 parts of xylene were charged and heated to 100° C. under agitation. From the dropping funnel, each mixture consisting of monomers and polymerization initiators as specified in Table 3 was dropped at a constant rate over a period of 3 hr. After the completion of dropping, 1 part of t-butyl peroctoate and 10 parts of xylene were further dropped over a period of 2 hr. Thus, there were obtained solutions containing metal-containing copolymers A-11 to A-23 which had properties specified in Table 3.

TABLE 3

|  |  | Prod. Ex. 17 | Prod. Ex. 18 | Prod. Ex. 19 | Prod. Ex. 20 | Prod. Ex. 21 | Prod. Ex. 22 | Prod. Ex. 23 | Prod. Ex. 24 | Prod. Ex. 25 | Prod. Ex. 26 | Prod. Ex. 27 | Prod. Ex. 28 | Prod. Ex. 29 |
|---|---|---|---|---|---|---|---|---|---|---|---|---|---|---|
| Metal-contg. polymer |  | A-11 | A-12 | A-13 | A-14 | A-15 | A-16 | A-17 | A-18 | A-19 | A-20 | A-21 | A-22 | A-23 |
| Metal-contg. monomer (a1) (pts.) | zinc acrylate | 8 | 12 | 16 |  |  |  |  |  | 8 | 6 | 12 | 16 |  |
|  | zinc methacrylate |  |  |  | 12 |  | 35 |  |  | 8 | 6 |  |  |  |
|  | copper acrylate |  |  |  |  | 16 |  | 40 |  |  |  |  |  | 16 |
| Metal-contg. monomer (a2) (pts.) | versatato acrylate | 12 | 18 | 24 |  |  |  |  |  |  | 9 | 18 | 24 |  |
|  | versatato methacrylate |  |  |  |  | 28 |  |  | 35 |  | 9 |  |  |  |
|  | iso-stearatozinc acrylate |  |  |  |  |  |  |  |  | 12 |  |  |  |  |
|  | iso-stearatozinc methacrylate |  |  |  |  |  |  |  |  | 12 |  |  |  |  |
|  | versatato-copper acrylate |  |  |  |  |  | 24 |  |  |  |  |  |  | 24 |
| Polymerizable monomer (b) (pts.) | 2-methoxyethyl acrylate | 25 | 35 |  |  | 10 | 10 | 10 | 10 | 13 | 10 |  |  |  |
|  | 3-methoxybutyl acrylate |  |  | 40 |  | 40 | 30 | 40 | 30 |  |  |  |  |  |
|  | 3-methyl-3-methoxybutyl acrylate |  |  |  | 25 |  |  |  |  |  |  |  |  |  |
| Unsatd. monomer | methyl methacrylate | 30 |  | 10 |  |  |  |  |  | 13 | 13 | 20 | 10 | 10 |
|  | ethyl acrylate | 25 | 35 | 10 | 35 | 10 | 25 | 10 | 25 | 34 | 47 | 50 | 50 | 50 |
| Initiator | t-butyl peroctoate | 7 | 3 | 4 | 3 | 7 | 4 | 4 | 6 | 5 | 5 | 5 | 4 | 6 |
| Properties | Gardner viscosity (25° C.) | +Z | +V | −Z1 | +W | +Z1 | −Y | +Z2 | +Z | −Y | +X | −Z1 | −Z | −Z3 |
|  | heating residue (wt. %) | 50.9 | 50.1 | 50.6 | 50.3 | 51.1 | 50.4 | 50.9 | 50.5 | 49.7 | 49.7 | 50.2 | 49.9 | 49.4 |

Examples 1 to 65 and Comparative Examples 1 to 44

Antifouling coating compositions of formulations specified in Tables 4 to 12 were prepared according to customary procedure from the resin compositions containing metal-containing copolymers A-1 to A-23 obtained in the above Production Examples 7 to 29.

Sand blasted steel plates (each 30 cm length×10 cm width× 0.32 cm thickness) having anticorrosive paints, namely, shop primer, tar epoxy paint and vinyl paint applied in advance thereto in respective thicknesses of 20 µm, 150 µm and 75 µm were coated with the antifouling coating compositions of formulations specified in Tables 4 to 12 so as to have a dry coating thickness of 100 µm and dried, thereby obtaining test plates.

The test plates were left immersed in Hiroshima Bay of Hiroshima Prefecture for 12 months, during which the area of attachment of organisms (%), etc. were inspected every month.

The results are also listed in Tables 4 to 12.

In Tables 4 to 12, as components of the formulations, use was made of the following commercial products.

Chlorinated Paraffin:
 trade name "Toyoparax 150" (average number of carbon atoms: 14.5, chlorine content (wt.): 50%, viscosity: 12 poise/ 25° C., specific gravity: 1.25/25° C., produced by Tosoh Corporation)

Zinc Oxide:
 trade name "Zinc Flower No.3" (produced by Kyushu Hakusui K.K.)

Talc:
 trade name "TTK Talc" (produced by Takehara Kagaku Kogyo K.K.)

Red Iron Oxide:
 trade name "Bengara Gekko BB" (produced by Nippon Bengara Kogyo Co., Ltd.)

Titanium White:
 trade name "Titanium White R-5N" (produced by Sakai Chemical Industry Co., Ltd.)

Copper Rhodanide:
 produced by Nippon Kagaku Sangyo Co., Ltd.

Zinc Dimethyldithiocarbamate:
 "Sanceler PZ" (produced by Sanshin Chemical Industry Co., Ltd.)

2-Methylthio-4-t-butylamino-6-cyclopropylamino-s-triazine:
 trade name "Irgarol #105" (produced by Ciba-Geigy)

2,4,5,6-Tetrachloroisophthalonitrile:
 "Marincide C" (produced by San Nopco Limited)

N,N-dimethyldichlorophenylurea:
 "DCMU" (produced by Hodogaya Chemical Co., Ltd.)

N-(fluorodichloromethylthio)phthalimide:
 "Preventol A-3" (produced by Bayer Japan)

N,N'-dimethyl-N'-phenyl-(N-fluorodichloromethylthio)-sulfamide:
 "Preventol A-4S" (produced by Bayer Japan)

Tetramethylthiuram Disulfide:
 "Sanceler TT" (produced by Sanshin Chemical Industry Co., Ltd.)

2,4,6-Trichlorophenylmaleimide:
 "IT-354" (produced by Ihara Chemical Industry Co., Ltd.)

2,3,5,6-Tetrachloro-4-(methylsulfonyl)pyridine:
 "Densil S100" (produced by Avecia Co., Ltd.)

3-Iodo-2-propynylbutyl carbamate:
 "Troysan Polyphase P100" (produced by Troy)

Diiodomethyl-p-tolyl Sulfone:
 "Amical 48" (produced by Abbott)

Bisdimethylditiocarbamoylzinc Ethylenebisdithiocarbamate:
 "TOC-3204" (produced by Tokyo Organic Chemical Industries, Ltd.)

Zinc Ethylenebisdithiocarbamate:
 trade name "Zineb" (produced by Tokyo Organic Chemical Industries, Ltd.)

Pyridine-Triphenylboron:
 trade name "PK Boron" (produced by Hokko Chemical Industry Co., Ltd.)

Zinc Salt of 2-pyridinethiol-1-oxide:
 trade name "AF-Z" (produced by Yoshitomi Fine Chemical, Ltd.)

Copper salt of 2-pyridinethiol-1-oxide:
 trade name "Copper Pyrithione" (produced by Olin Ltd.)

4,5-Dichloro-2-n-octyl-4-isothiazolin-3-one:
 trade name "Sea-Nine 211" (produced by Rohm and Haas Company)

Cuprous Oxide:
 average particle diameter 8 µm, trade name "NC-801" (produced by Nippon Chemical Industries Co., Ltd.)

Polyethylene Oxide Wax:
 trade name "Disparlon 4200-20 (Dispal 4200-20X)" (produced by Kusumoto Chemicals, Ltd.), 20% xylene paste Aliphatic Amide Wax:
 trade name "Disparlon A630-20X (Dispal A630-20X)" (produced by Kusumoto Chemicals, Ltd.), 20% xylene paste Propylene Glycol Monomethyl Ether:
 trade name "Kuraray PGM" (produced by Kuraray Co., Ltd.), solvent.

The evaluation criteria are as follows.

Evaluation Criteria

<Evaluation Criteria on Area of Attachment of Undersea Organisms (Evaluation Criteria on Stationary Antifouling Performance)>

5 marks . . . the area of attachment of undersea organisms is 0%;
 4 marks . . . the area of attachment of undersea organisms is over 0% but not greater than 5%;
 3 marks . . . the area of attachment of undersea organisms is over 5% but not greater than 10%;
 2 marks . . . the area of attachment of undersea organisms is over 10% but not greater than 25%;
 1 mark . . . the area of attachment of undersea organisms is over 25% but not greater than 50%; and
 0 mark . . . the area of attachment of undersea organisms is over 50%.

<Adherence to Deteriorated Antifouling Coating Film>

The adherence to deteriorated antifouling coating films was evaluated in the following manner. First, the surface of each of deteriorated antifouling coating films resulting from applying of the following now available antifouling paints to test plates and immersing of the test plates in seawater for one year was coated with each of the antifouling coating compositions described in the Examples and Comparative Examples, thereby forming antifouling coating films of 100 µm dry film thickness. The test plates with the antifouling coating films were immersed in seawater, and upon the passage of 6 months, the adherence was evaluated in accordance with the "JIS K-5400X cut tape method". The now available antifouling paints used in the test were "Chugoku AF", "Ravax AF", "Vinyl AF", "Marine Star 10 Kai", "AF Sea Flo Z-100 LEHS", "Sea Grandprix 500", "Sea Grandprix 700" and "Sea Grandprix 1000" (all produced by Chugoku Marine Paints, Ltd.).

<Method of Measuring Coating Film Wasting Rate>

Iron plates with a size of 170 mm (length)×70 mm (width)×4.5 mm (thickness) were provided, and curved in the longitudinal direction with R=500 mm (radius of curvature). Threaded holes for mounting on a rotary drum were formed at four corners of each of the plates, and sand blasted.

The sand blasted iron plates on the curved protrudent surfaces were sequentially spray coated with a shop primer, a tar epoxy paint and a vinyl paint, and thereafter coated with various test paints (dry film thickness: 200 µm).

The thus obtained test plates were mounted on a rotary drum fixed to a rotary test raft placed in Kure Bay of Hiroshima Prefecture. The test plates were rotated at a rotational speed of 15 knots. The coating film wasting rate was determined by drawing up the test plates from the seawater and measuring the coating film thickness thereof every month.

TABLE 4

| | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Recipe of antifouling coating compsn. (pts. wt) | | | | | | | | | | | | |
| metal-contg. copolymer A-1 | 45 | | | | | | | | | | 45 | |
| metal-contg. copolymer A-2 | | 45 | | | | | | | | | | 45 |
| metal-contg. copolymer A-3 | | | 45 | | | | | | | | | |
| metal-contg. copolymer A-4 | | | | 45 | | | | | | | | |
| metal-contg. copolymer A-5 | | | | | 45 | | | | | | | |
| metal-contg. copolymer A-6 | | | | | | 45 | | | | | | |
| metal-contg. copolymer A-7 | | | | | | | 45 | | | | | |
| metal-contg. copolymer A-8 | | | | | | | | 45 | | | | |
| metal-contg. copolymer A-9 | | | | | | | | | 45 | | | |
| metal-contg. copolymer A-10 | | | | | | | | | | 45 | | |
| chlorinated paraffin | | | | | | | | | | | 2 | 2 |
| zinc oxide | 10 | 10 | 10 | 10 | 10 | 10 | 10 | 10 | 10 | 10 | 10 | 10 |
| talc | 17 | 17 | 17 | 17 | 17 | 17 | 17 | 17 | 17 | 17 | 17 | 17 |
| red iron oxide | 2 | 2 | 2 | 2 | 2 | 2 | 2 | 2 | 2 | 2 | 2 | 2 |
| titanium white | 4 | 4 | 4 | 4 | 4 | 4 | 4 | 4 | 4 | 4 | 4 | 4 |
| zinc salt of 2-pyridinethiol-1-oxide | 3 | 3 | 3 | 3 | 3 | 3 | 3 | 3 | 3 | 3 | | |
| copper salt of 2-pyridinethiol-1-oxide | | | | | | | | | | | 3 | 3 |
| 4,5-dichloro-2-n-octyl-4-isothiazolin-3-one* | 10 | 10 | 10 | 10 | 10 | 10 | 10 | 10 | 10 | 10 | 10 | 10 |
| cuprous oxide | | | | | | | | | | | | |
| polyethylene oxide wax, 20% xylene paste | 2 | 2 | 2 | 2 | 2 | 2 | 2 | 2 | 2 | 2 | 2 | 2 |
| aliphatic amide wax, 20% xylene paste | 3 | 3 | 3 | 3 | 3 | 3 | 3 | 3 | 3 | 3 | 3 | 3 |
| xylene | 2 | 2 | 2 | 2 | 2 | 2 | 2 | 2 | 2 | 2 | | |
| propylene glycol monomethyl ether | 2 | 2 | 2 | 2 | 2 | 2 | 2 | 2 | 2 | 2 | 2 | 2 |
| Total | 100 | 100 | 100 | 100 | 100 | 100 | 100 | 100 | 100 | 100 | 100 | 100 |
| Properties of antifouling coating | | | | | | | | | | | | |
| stationary antifouling performance/5 marks full score (3 mo. seawater immersion) | 5 | 5 | 5 | 5 | 5 | 5 | 5 | 5 | 5 | 5 | 5 | 5 |
| stationary antifouling performance/5 marks full score (6 mo. seawater immersion) | 5 | 5 | 5 | 5 | 5 | 5 | 5 | 5 | 5 | 5 | 5 | 5 |
| stationary antifouling performance/5 marks full score (12 mo. seawater immersion) | 5 | 5 | 5 | 5 | 5 | 5 | 5 | 5 | 5 | 5 | 5 | 5 |
| adherence to deteriorated antifouling coating film (6 mo. seawater immersion) | 10 | 10 | 10 | 10 | 10 | 10 | 10 | 10 | 10 | 10 | 10 | 10 |
| wasting of coating film 3 mo. total | 42.5 | 39.9 | 43.0 | 41.5 | 43.1 | 44.9 | 40.8 | 42.0 | 47.3 | 43.4 | 41.7 | 38.6 |
| wasting of coating film 6 mo. total | 79.2 | 70.5 | 88.2 | 85.4 | 91.7 | 90.3 | 85.6 | 79.0 | 92.1 | 80.8 | 85.1 | 77.5 |

*30% xylene soln. of 4,5-dichloro-2-n-octyl-4-isothiazolin-3-one

TABLE 5

| | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 | Ex. 25 |
|---|---|---|---|---|---|---|---|---|---|---|---|---|---|
| Recipe of antifouling coating compsn. (pts. wt) | | | | | | | | | | | | | |
| metal-contg. copolymer A-11 | 40 | | | | | | | | | | | | |
| metal-contg. copolymer A-12 | | 40 | | | | | | | | | | | |
| metal-contg. copolymer A-13 | | | 40 | | | | | | | | | | |
| metal-contg. copolymer A-14 | | | | 40 | | | | | | | | | |
| metal-contg. copolymer A-15 | | | | | 40 | | | | | | | | |
| metal-contg. copolymer A-16 | | | | | | 40 | | | | | | | |
| metal-contg. copolymer A-17 | | | | | | | 40 | | | | | | |
| metal-contg. copolymer A-18 | | | | | | | | 40 | | | | | |
| metal-contg. copolymer A-19 | | | | | | | | | 40 | | | | |
| metal-contg. copolymer A-20 | | | | | | | | | | 40 | | | |
| metal-contg. copolymer A-21 | | | | | | | | | | | 40 | | |
| metal-contg. copolymer A-22 | | | | | | | | | | | | 40 | |
| metal-contg. copolymer A-23 | | | | | | | | | | | | | 40 |
| chlorinated paraffin | | | | | | | | | | | | | |
| zinc oxide | 10 | 10 | 10 | 10 | 10 | 10 | 10 | 10 | 10 | 10 | 10 | 10 | 10 |
| talc | 17 | 17 | 17 | 17 | 17 | 17 | 17 | 17 | 17 | 17 | 17 | 17 | 17 |
| red iron oxide | 2 | 2 | 2 | 2 | 2 | 2 | 2 | 2 | 2 | 2 | 2 | 2 | 2 |
| titanium white | 4 | 4 | 4 | 4 | 4 | 4 | 4 | 4 | 4 | 4 | 4 | 4 | 4 |
| zinc salt of 2-pyridinethiol-1-oxide | 3 | 3 | 3 | 3 | 3 | 3 | 3 | 3 | 3 | 3 | 3 | 3 | 3 |
| copper salt of 2-pyridinethiol-1-oxide | | | | | | | | | | | | | |
| 4,5-dichloro-2-n-octyl-4-isothiazolin-3-one* | 10 | 10 | 10 | 10 | 10 | 10 | 10 | 10 | 10 | 10 | 10 | 10 | 10 |
| cuprous oxide | | | | | | | | | | | | | |
| polyethylene oxide wax, 20% xylene paste | 2 | 2 | 2 | 2 | 2 | 2 | 2 | 2 | 2 | 2 | 2 | 2 | 2 |
| aliphatic amide wax, 20% xylene paste | 3 | 3 | 3 | 3 | 3 | 3 | 3 | 3 | 3 | 3 | 3 | 3 | 3 |
| xylene | 7 | 7 | 7 | 7 | 7 | 7 | 7 | 7 | 7 | 7 | 7 | 7 | 7 |
| propylene glycol monomethyl ether | 2 | 2 | 2 | 2 | 2 | 2 | 2 | 2 | 2 | 2 | 2 | 2 | 2 |
| Total | 100 | 100 | 100 | 100 | 100 | 100 | 100 | 100 | 100 | 100 | 100 | 100 | 100 |
| Properties of antifouling coating | | | | | | | | | | | | | |
| stationary antifouling performance/5 marks full score (3 mo. seawater immersion) | 5 | 5 | 5 | 5 | 5 | 5 | 5 | 5 | 5 | 5 | 5 | 5 | 5 |
| stationary antifouling performance/5 marks full score (6 mo. seawater immersion) | 5 | 5 | 5 | 5 | 5 | 5 | 5 | 5 | 5 | 5 | 5 | 5 | 5 |
| stationary antifouling performance/5 marks full score (12 mo. seawater immersion) | 5 | 5 | 5 | 5 | 5 | 5 | 5 | 5 | 5 | 5 | 5 | 5 | 5 |
| adherence to deteriorated antifouling coating film (6 mo. seawater immersion) | 10 | 10 | 10 | 10 | 10 | 10 | 10 | 10 | 10 | 10 | 10 | 10 | 10 |
| wasting of coating film 3 mo. total | 32.3 | 39.4 | 46.0 | 48.1 | 46.4 | 40.9 | 44.8 | 39.8 | 45.0 | 37.7 | 38.4 | 44.7 | 45.2 |
| wasting of coating film 6 mo. total | 69.0 | 72.3 | 85.1 | 93.5 | 90.2 | 79.3 | 86.7 | 68.0 | 84.9 | 72.4 | 68.8 | 90.0 | 91.2 |

*30% xylene soln. of 4,5-dichloro-2-n-octyl-4-isothiazolin-3-one

TABLE 6

| | Ex. 26 | Ex. 27 | Ex. 28 | Ex. 29 | Ex. 30 | Ex. 31 | Ex. 32 | Ex. 33 | Ex. 34 | Ex. 35 | Ex. 36 | Ex. 37 |
|---|---|---|---|---|---|---|---|---|---|---|---|---|
| Recipe of antifouling coating compsn. (pts. wt) | | | | | | | | | | | | |
| metal-contg. copolymer A-1 | 45 | 45 | | | | | | | | | | |
| metal-contg. copolymer A-2 | | | 45 | 45 | | | | | | | | |
| metal-contg. copolymer A-3 | | | | | 45 | 45 | | | | | | |
| metal-contg. copolymer A-4 | | | | | | | 45 | 45 | | | | |
| metal-contg. copolymer A-5 | | | | | | | | | 45 | 45 | | |
| metal-contg. copolymer A-6 | | | | | | | | | | | 45 | 45 |
| metal-contg. copolymer A-7 | | | | | | | | | | | | |
| metal-contg. copolymer A-8 | | | | | | | | | | | | |
| metal-contg. copolymer A-9 | | | | | | | | | | | | |
| metal-contg. copolymer A-10 | | | | | | | | | | | | |
| chlorinated paraffin | | | | | | | | | | | | |
| zinc oxide | 10 | 10 | 10 | 10 | 10 | 10 | 10 | 10 | 10 | 10 | 10 | 10 |
| talc | 15 | 18 | 15 | 18 | 15 | 18 | 15 | 18 | 15 | 18 | 15 | 18 |
| red iron oxide | 2 | 2 | 2 | 2 | 2 | 2 | 2 | 2 | 2 | 2 | 2 | 2 |
| titanium white | 4 | 4 | 4 | 4 | 4 | 4 | 4 | 4 | 4 | 4 | 4 | 4 |
| zinc salt of 2-pyridinethiol-1-oxide | 5 | 1 | 5 | 1 | 5 | 1 | 5 | 1 | 5 | 1 | 5 | 1 |
| copper salt of 2-pyridinethiol-1-oxide | | | | | | | | | | | | |
| 4,5-dichloro-2-n-octyl-4-isothiazolin-3-one* | 5 | 15 | 5 | 15 | 5 | 15 | 5 | 15 | 5 | 15 | 5 | 15 |
| cuprous oxide | | | | | | | | | | | | |
| polyethylene oxide wax, 20% xylene paste | 2 | 2 | 2 | 2 | 2 | 2 | 2 | 2 | 2 | 2 | 2 | 2 |
| aliphatic amide wax, 20% xylene paste | 3 | 3 | 3 | 3 | 3 | 3 | 3 | 3 | 3 | 3 | 3 | 3 |
| xylene | 7 | | 7 | | 7 | | 7 | | 7 | | 7 | |
| propylene glycol monomethyl ether | 2 | | 2 | | 2 | | 2 | | 2 | | 2 | |
| Total | 100 | 100 | 100 | 100 | 100 | 100 | 100 | 100 | 100 | 100 | 100 | 100 |
| Properties of antifouling coating | | | | | | | | | | | | |
| stationary antifouling performance/5 marks full score (3 mo. seawater immersion) | 5 | 5 | 5 | 5 | 5 | 5 | 5 | 5 | 5 | 5 | 5 | 5 |
| stationary antifouling performance/5 marks full score (6 mo. seawater immersion) | 5 | 5 | 5 | 5 | 5 | 5 | 5 | 5 | 5 | 5 | 5 | 5 |
| stationary antifouling performance/5 marks full score (12 mo. seawater immersion) | 5 | 5 | 5 | 5 | 5 | 5 | 5 | 5 | 5 | 5 | 5 | 5 |
| adherence to deteriorated antifouling coating film (6 mo. seawater immersion) | 10 | 10 | 10 | 10 | 10 | 10 | 10 | 10 | 10 | 10 | 10 | 10 |
| wasting of coating film 3 mo. total | 40.9 | 42.5 | 39.0 | 40.8 | 44.1 | 42.5 | 40.4 | 39.2 | 38.9 | 40.0 | 43.5 | 44.1 |
| wasting of coating film 6 mo. total | 83.1 | 85.0 | 70.5 | 84.4 | 89.1 | 89.2 | 74.6 | 68.2 | 72.4 | 75.3 | 90.3 | 87.6 |

*30% xylene soln. of 4,5-dichloro-2-n-octyl-4-isothiazolin-3-one

TABLE 7

| | Ex. 38 | Ex. 39 | Ex. 40 | Ex. 41 | Ex. 42 | Ex. 43 | Ex. 44 | Ex. 45 | Ex. 46 | Ex. 47 | Ex. 48 | Ex. 49 | Ex. 50 | Ex. 51 |
|---|---|---|---|---|---|---|---|---|---|---|---|---|---|---|
| Recipe of antifouling coating compsn. (pts. wt) | | | | | | | | | | | | | | |
| metal-contg. copolymer A-1 | 45 | 45 | 45 | 45 | 45 | 45 | 45 | 45 | 45 | 45 | 45 | 45 | 45 | 45 |
| zinc oxide | 10 | 10 | 10 | 10 | 10 | 10 | 10 | 10 | 10 | 10 | 10 | 10 | 10 | 10 |
| talc | 14 | 14 | 14 | 14 | 14 | 14 | 14 | 14 | 14 | 14 | 14 | 14 | 14 | 14 |
| red iron oxide | 2 | 2 | 2 | 2 | 2 | 2 | 2 | 2 | 2 | 2 | 2 | 2 | 2 | 2 |
| titanium white | 4 | 4 | 4 | 4 | 4 | 4 | 4 | 4 | 4 | 4 | 4 | 4 | 4 | 4 |
| copper rhodanide | 3 | | | | | | | | | | | | | |
| zinc dimethyldithiocarbamate | | 3 | | | | | | | | | | | | |
| 2-methylthio-4-t-butylamino-6-cyclopropylamino-s-triazine | | | 3 | | | | | | | | | | | |
| 2,4,5,6-tetrachloroisophthalonitrile | | | | 3 | | | | | | | | | | |
| N,N-dimethyldichlorophenylurea | | | | | 3 | | | | | | | | | |
| N-(fluorodichloromethylthio)-phthalimide | | | | | | 3 | | | | | | | | |

TABLE 7-continued

|  | Ex. 38 | Ex. 39 | Ex. 40 | Ex. 41 | Ex. 42 | Ex. 43 | Ex. 44 | Ex. 45 | Ex. 46 | Ex. 47 | Ex. 48 | Ex. 49 | Ex. 50 | Ex. 51 |
|---|---|---|---|---|---|---|---|---|---|---|---|---|---|---|
| N,N'-dimethyl-N'-phenyl-(N-fluorodichloromethylthio)-sulfamide |  |  |  |  |  |  | 3 |  |  |  |  |  |  |  |
| tetramethylthiuram disulfide |  |  |  |  |  |  |  | 3 |  |  |  |  |  |  |
| 2,4,6-trichlorophenylmaleimide |  |  |  |  |  |  |  |  | 3 |  |  |  |  |  |
| 2,3,5,6-tetrachloro-4-(methylsulfonyl)pyridine |  |  |  |  |  |  |  |  |  | 3 |  |  |  |  |
| 3-iodo-2-propynylbutyl carbamate |  |  |  |  |  |  |  |  |  |  | 3 |  |  |  |
| diiodomethyl-p-tolyl sulfone |  |  |  |  |  |  |  |  |  |  |  | 3 |  |  |
| bisdimethylditiocarbamoylzinc ethylenebisdithiocarbamate |  |  |  |  |  |  |  |  |  |  |  |  | 3 |  |
| zinc ethylenebisdithiocarbamate |  |  |  |  |  |  |  |  |  |  |  |  |  | 3 |
| zinc salt of 2-pyridinethiol-1-oxide | 3 | 3 | 3 | 3 | 3 | 3 | 3 | 3 | 3 | 3 | 3 | 3 | 3 | 3 |
| copper salt of 2-pyridinethiol-1-oxide |  |  |  |  |  |  |  |  |  |  |  |  |  |  |
| 4,5-dichloro-2-n-octyl-4-isothiazolin-3-one* | 10 | 10 | 10 | 10 | 10 | 10 | 10 | 10 | 10 | 10 | 10 | 10 | 10 | 10 |
| cuprous oxide |  |  |  |  |  |  |  |  |  |  |  |  |  |  |
| polyethylene oxide wax, 20% xylene paste | 2 | 2 | 2 | 2 | 2 | 2 | 2 | 2 | 2 | 2 | 2 | 2 | 2 | 2 |
| aliphatic amide wax, 20% xylene paste | 3 | 3 | 3 | 3 | 3 | 3 | 3 | 3 | 3 | 3 | 3 | 3 | 3 | 3 |
| xylene | 2 | 2 | 2 | 2 | 2 | 2 | 2 | 2 | 2 | 2 | 2 | 2 | 2 | 2 |
| propylene glycol monomethyl ether | 2 | 2 | 2 | 2 | 2 | 2 | 2 | 2 | 2 | 2 | 2 | 2 | 2 | 2 |
| Total | 100 | 100 | 100 | 100 | 100 | 100 | 100 | 100 | 100 | 100 | 100 | 100 | 100 | 100 |
| Properties of antifouling coating |  |  |  |  |  |  |  |  |  |  |  |  |  |  |
| stationary antifouling performance/5 marks full score (3 mo. seawater immersion) | 5 | 5 | 5 | 5 | 5 | 5 | 5 | 5 | 5 | 5 | 5 | 5 | 5 | 5 |
| stationary antifouling performance/5 marks full score (6 mo. seawater immersion) | 5 | 5 | 5 | 5 | 5 | 5 | 5 | 5 | 5 | 5 | 5 | 5 | 5 | 5 |
| stationary antifouling performance/5 marks full score (12 mo. seawater immersion) | 5 | 5 | 5 | 5 | 5 | 5 | 5 | 5 | 5 | 5 | 5 | 5 | 5 | 5 |
| adherence to deteriorated antifouling coating film (6 mo. seawater immersion) | 10 | 10 | 10 | 10 | 10 | 10 | 10 | 10 | 10 | 10 | 10 | 10 | 10 | 10 |
| wasting of coating film 3 mo. total | 43.3 | 40.2 | 42.9 | 45.0 | 39.9 | 42.9 | 43.3 | 43.5 | 42.7 | 42.4 | 40.8 | 44.1 | 41.6 | 40.8 |
| wasting of coating film 6 mo. total | 75.4 | 76.9 | 81.0 | 83.2 | 70.2 | 73.3 | 80.4 | 80.0 | 74.7 | 79.6 | 68.5 | 84.2 | 72 | 75.6 |

*30% xylene soln. of 4,5-dichloro-2-n-octyl-4-isothiazolin-3-one

TABLE 8

|  | Ex. 52 | Ex. 53 | Ex. 54 | Ex. 55 | Ex. 56 | Ex. 57 | Ex. 58 | Ex. 59 | Ex. 60 | Ex. 61 | Ex. 62 | Ex. 63 | Ex. 64 | Ex. 65 |
|---|---|---|---|---|---|---|---|---|---|---|---|---|---|---|
| Recipe of antifouling coating compsn. (pts. wt) |  |  |  |  |  |  |  |  |  |  |  |  |  |  |
| metal-contg. copolymer A-2 | 45 | 45 | 45 | 45 | 45 | 45 | 45 | 45 | 45 | 45 | 45 | 45 | 45 | 45 |
| zinc oxide | 10 | 10 | 10 | 10 | 10 | 10 | 10 | 10 | 10 | 10 | 10 | 10 | 10 | 10 |
| talc | 14 | 14 | 14 | 14 | 14 | 14 | 14 | 14 | 14 | 14 | 14 | 14 | 14 | 14 |
| red iron oxide | 2 | 2 | 2 | 2 | 2 | 2 | 2 | 2 | 2 | 2 | 2 | 2 | 2 | 2 |
| titanium white | 4 | 4 | 4 | 4 | 4 | 4 | 4 | 4 | 4 | 4 | 4 | 4 | 4 | 4 |
| copper rhodanide | 3 |  |  |  |  |  |  |  |  |  |  |  |  |  |
| zinc dimethyldithiocarbamate |  | 3 |  |  |  |  |  |  |  |  |  |  |  |  |
| 2-methylthio-4-t-butylamino-6-cyclopropylamino-s-triazine |  |  | 3 |  |  |  |  |  |  |  |  |  |  |  |
| 2,4,5,6-tetrachloroisophthalonitrile |  |  |  | 3 |  |  |  |  |  |  |  |  |  |  |
| N,N-dimethyldichlorophenylurea |  |  |  |  | 3 |  |  |  |  |  |  |  |  |  |
| N-(fluorodichloromethylthio)-phthalimide |  |  |  |  |  | 3 |  |  |  |  |  |  |  |  |
| N,N'-dimethyl-N'-phenyl-(N-fluorodichloromethylthio)-sulfamide |  |  |  |  |  |  | 3 |  |  |  |  |  |  |  |

TABLE 8-continued

| | Ex. 52 | Ex. 53 | Ex. 54 | Ex. 55 | Ex. 56 | Ex. 57 | Ex. 58 | Ex. 59 | Ex. 60 | Ex. 61 | Ex. 62 | Ex. 63 | Ex. 64 | Ex. 65 |
|---|---|---|---|---|---|---|---|---|---|---|---|---|---|---|
| tetramethylthiuram disulfide | | | | | | | | 3 | | | | | | |
| 2,4,6-trichlorophenylmaleimide | | | | | | | | | 3 | | | | | |
| 2,3,5,6-tetrachloro-4-(methylsulfonyl)pyridine | | | | | | | | | | 3 | | | | |
| 3-iodo-2-propynylbutyl carbamate | | | | | | | | | | | 3 | | | |
| diiodomethyl-p-tolyl sulfone | | | | | | | | | | | | 3 | | |
| bisdimethylditiocarbamoylzinc ethylenebisdithiocarbamate | | | | | | | | | | | | | 3 | |
| zinc ethylenebisdithiocarbamate | | | | | | | | | | | | | | 3 |
| pyridine-triphenylborane | | | | | | | | | | | | | | |
| zinc salt of 2-pyridinethiol-1-oxide | 3 | 3 | 3 | 3 | 3 | 3 | 3 | 3 | 3 | 3 | 3 | 3 | 3 | 3 |
| copper salt of 2-pyridinethiol-1-oxide | | | | | | | | | | | | | | |
| 4,5-dichloro-2-n-octyl-4-isothiazolin-3-one* | 10 | 10 | 10 | 10 | 10 | 10 | 10 | 10 | 10 | 10 | 10 | 10 | 10 | 10 |
| cuprous oxide | | | | | | | | | | | | | | |
| polyethylene oxide wax, 20% xylene paste | 2 | 2 | 2 | 2 | 2 | 2 | 2 | 2 | 2 | 2 | 2 | 2 | 2 | 2 |
| aliphatic amide wax, 20% xylene paste | 3 | 3 | 3 | 3 | 3 | 3 | 3 | 3 | 3 | 3 | 3 | 3 | 3 | 3 |
| xylene | 2 | 2 | 2 | 2 | 2 | 2 | 2 | 2 | 2 | 2 | 2 | 2 | 2 | 2 |
| propylene glycol monomethyl ether | 2 | 2 | 2 | 2 | 2 | 2 | 2 | 2 | 2 | 2 | 2 | 2 | 2 | 2 |
| Total | 100 | 100 | 100 | 100 | 100 | 100 | 100 | 100 | 100 | 100 | 100 | 100 | 100 | 100 |
| Properties of antifouling coating | | | | | | | | | | | | | | |
| stationary antifouling performance/5 marks full score (3 mo. seawater immersion) | 5 | 5 | 5 | 5 | 5 | 5 | 5 | 5 | 5 | 5 | 5 | 5 | 5 | 5 |
| stationary antifouling performance/5 marks full score (6 mo. seawater immersion) | 5 | 5 | 5 | 5 | 5 | 5 | 5 | 5 | 5 | 5 | 5 | 5 | 5 | 5 |
| stationary antifouling performance/5 marks full score (12 mo. seawater immersion) | 5 | 5 | 5 | 5 | 5 | 5 | 5 | 5 | 5 | 5 | 5 | 5 | 5 | 5 |
| adherence to deteriorated antifouling coating film (6 mo. seawater immersion) | 10 | 10 | 10 | 10 | 10 | 10 | 10 | 10 | 10 | 10 | 10 | 10 | 10 | 10 |
| wasting of coating film 3 mo. total | 38.8 | 40.8 | 39.6 | 37.7 | 41.0 | 40.3 | 40.1 | 39.2 | 38.5 | 40.2 | 41.9 | 42.4 | 39.5 | 38.3 |
| wasting of coating film 6 mo. total | 73.1 | 79.9 | 77.1 | 84.1 | 90.3 | 75.4 | 77.1 | 80.2 | 76.5 | 83.0 | 80.3 | 75.0 | 88.4 | 79.2 |

*30% xylene soln. of 4,5-dichloro-2-n-octyl-4-isothiazolin-3-one

TABLE 9

| | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|
| Recipe of antifouling coating compsn. (pts. wt) | | | | | | | | | | | | |
| metal-contg. copolymer A-1 | 45 | 45 | | | | | | | | | | |
| metal-contg. copolymer A-2 | | | 45 | 45 | | | | | | | | |
| metal-contg. copolymer A-3 | | | | | 45 | 45 | | | | | | |
| metal-contg. copolymer A-4 | | | | | | | 45 | 45 | | | | |
| metal-contg. copolymer A-5 | | | | | | | | | 45 | 45 | | |
| metal-contg. copolymer A-6 | | | | | | | | | | | 45 | 45 |
| zinc oxide | 10 | 10 | 10 | 10 | 10 | 10 | 10 | 10 | 10 | 10 | 10 | 10 |
| talc | 20 | 15 | 20 | 15 | 20 | 15 | 20 | 15 | 20 | 15 | 20 | 15 |
| red iron oxide | 2 | 2 | 2 | 2 | 2 | 2 | 2 | 2 | 2 | 2 | 2 | 2 |
| titanium white | 4 | 4 | 4 | 4 | 4 | 4 | 4 | 4 | 4 | 4 | 4 | 4 |
| zinc salt of 2-pyridinethiol-1-oxide | | 5 | | 5 | | 5 | | 5 | | 5 | | 5 |
| copper salt of 2-pyridinethiol-1-oxide | | | | | | | | | | | | |
| 4,5-dichloro-2-n-octyl-4-isothiazolin-3-one* | | 10 | | 10 | | 10 | | 10 | | 10 | | 10 |
| cuprous oxide | | | | | | | | | | | | |
| polyethylene oxide wax, 20% xylene paste | 2 | 2 | 2 | 2 | 2 | 2 | 2 | 2 | 2 | 2 | 2 | 2 |

TABLE 9-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 | Comp. Ex. 11 | Comp. Ex. 12 |
|---|---|---|---|---|---|---|---|---|---|---|---|---|
| aliphatic amide wax, 20% xylene paste | 3 | 3 | 3 | 3 | 3 | 3 | 3 | 3 | 3 | 3 | 3 | 3 |
| xylene | 2 | 12 | 2 | 12 | 2 | 12 | 2 | 12 | 2 | 12 | 2 | 12 |
| propylene glycol monomethyl ether | 2 | 2 | 2 | 2 | 2 | 2 | 2 | 2 | 2 | 2 | 2 | 2 |
| Total | 100 | 100 | 100 | 100 | 100 | 100 | 100 | 100 | 100 | 100 | 100 | 100 |
| Properties of antifouling coating |  |  |  |  |  |  |  |  |  |  |  |  |
| stationary antifouling performance/5 marks full score (3 mo. seawater immersion) | 5 | 5 | 5 | 5 | 5 | 5 | 5 | 5 | 5 | 5 | 5 | 5 |
| stationary antifouling performance/5 marks full score (6 mo. seawater immersion) | 4 | 4 | 4 | 4 | 4 | 4 | 4 | 4 | 4 | 4 | 4 | 4 |
| stationary antifouling performance/5 marks full score (12 mo. seawater immersion) | 4 | 3 | 4 | 3 | 4 | 3 | 4 | 3 | 4 | 3 | 4 | 3 |
| adherence to deteriorated antifouling coating film (6 mo. seawater immersion) | 10 | 10 | 10 | 10 | 10 | 10 | 10 | 10 | 10 | 10 | 10 | 10 |
| wasting of coating film 3 mo. total | 43.9 | 40.2 | 42.8 | 40.0 | 44.7 | 42.3 | 40.8 | 39.4 | 38.9 | 37.0 | 45.1 | 44.6 |
| wasting of coating film 6 mo. total | 80.1 | 76.5 | 71.0 | 74.2 | 80.5 | 80.1 | 75.4 | 69.3 | 78.1 | 67.3 | 84.9 | 82.8 |

*30% xylene soln. of 4,5-dichloro-2-n-octyl-4-isothiazolin-3-one

TABLE 10

|  | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 | Comp. Ex. 21 | Comp. Ex. 22 | Comp. Ex. 23 | Comp. Ex. 24 | Comp. Ex. 25 | Comp. Ex. 26 |
|---|---|---|---|---|---|---|---|---|---|---|---|---|---|---|
| Recipe of antifouling coating compsn. (pts. wt) |  |  |  |  |  |  |  |  |  |  |  |  |  |  |
| metal-contg. copolymer A-1 | 45 | 45 | 45 | 45 | 45 | 45 | 45 | 45 | 45 | 45 | 45 | 45 | 45 | 45 |
| zinc oxide | 10 | 10 | 10 | 10 | 10 | 10 | 10 | 10 | 10 | 10 | 10 | 10 | 10 | 10 |
| talc | 17 | 17 | 17 | 17 | 17 | 17 | 17 | 17 | 17 | 17 | 17 | 17 | 17 | 17 |
| red iron oxide | 2 | 2 | 2 | 2 | 2 | 2 | 2 | 2 | 2 | 2 | 2 | 2 | 2 | 2 |
| titanium white | 4 | 4 | 4 | 4 | 4 | 4 | 4 | 4 | 4 | 4 | 4 | 4 | 4 | 4 |
| copper rhodanide | 3 |  |  |  |  |  |  |  |  |  |  |  |  |  |
| zinc dimethyl-dithio-carbamate |  | 3 |  |  |  |  |  |  |  |  |  |  |  |  |
| 2-methylthio-4-t-butylamino-6-cyclo-propylamino-s-triazine |  |  | 3 |  |  |  |  |  |  |  |  |  |  |  |
| 2,4,5,6-tetrachloro-isophthalo-nitrile |  |  |  | 3 |  |  |  |  |  |  |  |  |  |  |
| N,N-dimethyl-dichloro-phenylurea |  |  |  |  | 3 |  |  |  |  |  |  |  |  |  |
| N-(fluoro-dichloro-methylthio)-phthalimide |  |  |  |  |  | 3 |  |  |  |  |  |  |  |  |
| N,N'-dimethyl-N'-phenyl-(N-fluorodi-chloro-methylthio)-sulfamide |  |  |  |  |  |  | 3 |  |  |  |  |  |  |  |
| tetramethyl-thiuram disulfide |  |  |  |  |  |  |  | 3 |  |  |  |  |  |  |

TABLE 10-continued

| | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 | Comp. Ex. 21 | Comp. Ex. 22 | Comp. Ex. 23 | Comp. Ex. 24 | Comp. Ex. 25 | Comp. Ex. 26 |
|---|---|---|---|---|---|---|---|---|---|---|---|---|---|---|
| 2,4,6-tri-chlorophenyl-maleimide | | | | | | | | | 3 | | | | | |
| 2,3,5,6-tetra-chloro-4-(methyl-sulfonyl)pyridine | | | | | | | | | | 3 | | | | |
| 3-iodo-2-propynylbutyl carbamate | | | | | | | | | | | 3 | | | |
| diiodomethyl-p-tolyl sulfone | | | | | | | | | | | | 3 | | |
| bisdimethyl-ditiocarbamoyl-zinc ethylene-bisdithio-carbamate | | | | | | | | | | | | | 3 | |
| zinc ethylene-bisdithio-carbamate | | | | | | | | | | | | | | 3 |
| 4,5-dichloro-2-n-octyl-4-isothiazolin-3-one* | 10 | 10 | 10 | 10 | 10 | 10 | 10 | 10 | 10 | 10 | 10 | 10 | 10 | 10 |
| cuprous oxide | | | | | | | | | | | | | | |
| polyethylene oxide wax, 20% xylene paste | 2 | 2 | 2 | 2 | 2 | 2 | 2 | 2 | 2 | 2 | 2 | 2 | 2 | 2 |
| aliphatic amide wax, 20% xylene paste | 3 | 3 | 3 | 3 | 3 | 3 | 3 | 3 | 3 | 3 | 3 | 3 | 3 | 3 |
| xylene | 2 | 2 | 2 | 2 | 2 | 2 | 2 | 2 | 2 | 2 | 2 | 2 | 2 | 2 |
| propylene glycol monomethyl ether | 2 | 2 | 2 | 2 | 2 | 2 | 2 | 2 | 2 | 2 | 2 | 2 | 2 | 2 |
| Total | 100 | 100 | 100 | 100 | 100 | 100 | 100 | 100 | 100 | 100 | 100 | 100 | 100 | 100 |
| Properties of antifouling coating | | | | | | | | | | | | | | |
| stationary antifouling performance/5 marks full score (3 mo. seawater immersion) | 5 | 5 | 5 | 5 | 5 | 5 | 5 | 5 | 5 | 5 | 5 | 5 | 5 | 5 |
| stationary antifouling performance/5 marks full score (6 mo. seawater immersion) | 4 | 4 | 4 | 4 | 4 | 4 | 4 | 4 | 4 | 4 | 4 | 4 | 4 | 4 |
| stationary antifouling performance/5 marks full score (12 mo. seawater immersion) | 4 | 4 | 4 | 4 | 4 | 4 | 4 | 4 | 4 | 4 | 4 | 4 | 4 | 4 |
| adherence to deteriorated antifouling coating film (6 mo. seawater immersion) | 10 | 10 | 10 | 10 | 10 | 10 | 10 | 10 | 10 | 10 | 10 | 10 | 10 | 10 |

TABLE 10-continued

|  | Comp. Ex. 13 | Comp. Ex. 14 | Comp. Ex. 15 | Comp. Ex. 16 | Comp. Ex. 17 | Comp. Ex. 18 | Comp. Ex. 19 | Comp. Ex. 20 | Comp. Ex. 21 | Comp. Ex. 22 | Comp. Ex. 23 | Comp. Ex. 24 | Comp. Ex. 25 | Comp. Ex. 26 |
|---|---|---|---|---|---|---|---|---|---|---|---|---|---|---|
| wasting of coating film 3 mo. total | 41.7 | 39.2 | 37.5 | 40.1 | 41.4 | 38.0 | 42.3 | 44.8 | 40.7 | 36.9 | 39.0 | 41.1 | 40.7 | 39.3 |
| wasting of coating film 6 mo. total | 79.2 | 68.1 | 67.4 | 78.0 | 85.1 | 73.0 | 77.1 | 86.9 | 75.4 | 63.1 | 72.5 | 76.2 | 82.3 | 70.2 |

*30% xylene soln. of 4,5-dichloro-2-n-octyl-4-isothiazolin-3-one

TABLE 11

|  | Comp. Ex. 27 | Comp. Ex. 28 | Comp. Ex. 29 | Comp. Ex. 30 | Comp. Ex. 31 | Comp. Ex. 32 | Comp. Ex. 33 | Comp. Ex. 34 | Comp. Ex. 35 | Comp. Ex. 36 | Comp. Ex. 37 | Comp. Ex. 38 | Comp. Ex. 39 | Comp. Ex. 40 |
|---|---|---|---|---|---|---|---|---|---|---|---|---|---|---|
| Recipe of antifouling coating compsn. (pts. wt) | | | | | | | | | | | | | | |
| metal-contg. copolymer A-1 | 45 | 45 | 45 | 45 | 45 | 45 | 45 | 45 | 45 | 45 | 45 | 45 | 45 | 45 |
| zinc oxide | 10 | 10 | 10 | 10 | 10 | 10 | 10 | 10 | 10 | 10 | 10 | 10 | 10 | 10 |
| talc | 12 | 12 | 12 | 12 | 12 | 12 | 12 | 12 | 12 | 12 | 12 | 12 | 12 | 12 |
| red iron oxide | 2 | 2 | 2 | 2 | 2 | 2 | 2 | 2 | 2 | 2 | 2 | 2 | 2 | 2 |
| titanium white | 4 | 4 | 4 | 4 | 4 | 4 | 4 | 4 | 4 | 4 | 4 | 4 | 4 | 4 |
| copper rhodanide | 3 | | | | | | | | | | | | | |
| zinc dimethyl-dithio-carbamate | | 3 | | | | | | | | | | | | |
| 2-methylthio-4-t-butylamino-6-cyclopropyl-amino-s-triazine | | | 3 | | | | | | | | | | | |
| 2,4,5,6-tetra-chloroiso-phthalonitrile | | | | 3 | | | | | | | | | | |
| N,N-dimethyl-dichloro-phenylurea | | | | | 3 | | | | | | | | | |
| N-(fluoro-dichloro-methylthio)-phthalimide | | | | | | 3 | | | | | | | | |
| N,N'-dimethyl-N'-phenyl-(N-fluorodichloro-methylthio)-sulfamide | | | | | | | 3 | | | | | | | |
| tetramethyl-thiuram disulfide | | | | | | | | 3 | | | | | | |
| 2,4,6-trichloro-phenyl-maleimide | | | | | | | | | 3 | | | | | |
| 2,3,5,6-tetra-chloro-4-(methyl-sulfonyl) pyridine | | | | | | | | | | 3 | | | | |
| 3-iodo-2-propynylbutyl carbamate | | | | | | | | | | | 3 | | | |
| diiodomethyl-p-tolyl sulfone | | | | | | | | | | | | 3 | | |
| bisdimethyl-ditiocarbamoyl-zin ethylene-bisdithio-carbamate | | | | | | | | | | | | | 3 | |
| zinc ethylene-bisdithio-carbamate | | | | | | | | | | | | | | 3 |

TABLE 11-continued

|  | Comp. Ex. 27 | Comp. Ex. 28 | Comp. Ex. 29 | Comp. Ex. 30 | Comp. Ex. 31 | Comp. Ex. 32 | Comp. Ex. 33 | Comp. Ex. 34 | Comp. Ex. 35 | Comp. Ex. 36 | Comp. Ex. 37 | Comp. Ex. 38 | Comp. Ex. 39 | Comp. Ex. 40 |
|---|---|---|---|---|---|---|---|---|---|---|---|---|---|---|
| zinc salt of 2-pyridinethiol-1-oxide | 5 | 5 | 5 | 5 | 5 | 5 | 5 | 5 | 5 | 5 | 5 | 5 | 5 | 5 |
| cuprous oxide |  |  |  |  |  |  |  |  |  |  |  |  |  |  |
| polyethylene oxide wax, 20% xylene paste | 2 | 2 | 2 | 2 | 2 | 2 | 2 | 2 | 2 | 2 | 2 | 2 | 2 | 2 |
| aliphatic amide wax, 20% xylene paste | 3 | 3 | 3 | 3 | 3 | 3 | 3 | 3 | 3 | 3 | 3 | 3 | 3 | 3 |
| xylene | 12 | 12 | 12 | 12 | 12 | 12 | 12 | 12 | 12 | 12 | 12 | 12 | 12 | 12 |
| propylene glycol monomethyl ether | 2 | 2 | 2 | 2 | 2 | 2 | 2 | 2 | 2 | 2 | 2 | 2 | 2 | 2 |
| Total | 100 | 100 | 100 | 100 | 100 | 100 | 100 | 100 | 100 | 100 | 100 | 100 | 100 | 100 |
| Properties of antifouling coating |  |  |  |  |  |  |  |  |  |  |  |  |  |  |
| stationary antifouling performance/5 marks full score (3 mo. seawater immersion) | 5 | 5 | 5 | 5 | 5 | 5 | 5 | 5 | 5 | 5 | 5 | 5 | 5 | 5 |
| stationary antifouling performance/5 marks full score (6 mo. seawater immersion) | 4 | 4 | 4 | 4 | 4 | 4 | 4 | 4 | 4 | 4 | 4 | 4 | 4 | 4 |
| stationary antifouling performance/5 marks full score (12 mo. seawater immersion) | 3 | 3 | 3 | 3 | 3 | 3 | 3 | 3 | 3 | 3 | 3 | 3 | 3 | 3 |
| adherence to deteriorated antifouling coating film (6 mo. seawater immersion) | 10 | 10 | 10 | 10 | 10 | 10 | 10 | 10 | 10 | 10 | 10 | 10 | 10 | 10 |
| wasting of coating film 3 mo. total | 36.8 | 39.5 | 40.2 | 44.3 | 35.0 | 40.8 | 39.8 | 42.7 | 42.0 | 43.4 | 38.2 | 40.9 | 42.5 | 43.1 |
| wasting of coating film 6 mo. total | 65.2 | 72.2 | 75.8 | 88.0 | 62.4 | 76.4 | 70.6 | 82.1 | 76.5 | 90.2 | 68.7 | 74.9 | 80.2 | 84.0 |

*30% xylene soln. of 4,5-dichloro-2-n-octyl-isothiazolin-3-one

TABLE 12

|  | Comp. Ex. 41 | Comp. Ex. 42 | Comp. Ex. 43 | Comp. Ex. 44 |
|---|---|---|---|---|
| Recipe of antifouling coating compsn. (pts. wt) |  |  |  |  |
| metal-contg. Copolymer A-1 | 45 | 45 | 45 | 45 |
| zinc oxide | 10 | 10 | 10 | 10 |
| talc | 10 | 10 | 10 | 10 |
| red iron oxide | 2 | 2 | 2 | 2 |
| titanium white | 4 | 4 | 4 | 4 |
| zinc dimethyldithiocarbamate |  |  |  |  |
| 2-methylthio-4-t-butylamino-6-cyclopropylamino-s-triazine | 5 | 5 | 5 | 5 |
| 2,4,5,6-tetrachloroisophthalonitrile | 5 |  |  |  |
| N,N-dimethyldichlorophenylurea |  | 5 |  |  |
| N,N'-dimethyl-N'-phenyl-(N-fluorodichloromethylthio)sulfamide |  |  | 5 |  |
| zinc ethylenebisdithiocarbamate |  |  |  | 5 |
| cuprous oxide |  |  |  |  |
| polyethylene oxide wax, 20% xylene paste | 2 | 2 | 2 | 2 |

TABLE 12-continued

| | Comp. Ex. 41 | Comp. Ex. 42 | Comp. Ex. 43 | Comp. Ex. 44 |
|---|---|---|---|---|
| aliphatic amide wax, 20% xylene paste | 3 | 3 | 3 | 3 |
| xylene | 12 | 12 | 12 | 12 |
| propylene glycol monomethyl ether | 2 | 2 | 2 | 2 |
| Total | 100 | 100 | 100 | 100 |
| Properties of antifouling coating | | | | |
| stationary antifouling performance/ 5 marks full score (3 mo. seawater immersion) | 5 | 5 | 5 | 5 |
| stationary antifouling performance/ 5 marks full score (6 mo. seawater immersion) | 3 | 3 | 3 | 3 |
| stationary antifouling performance/ 5 marks full score (12 mo. seawater immersion) | 1 | 1 | 1 | 1 |
| adherence to deteriorated antifouling coating film (6 mo. seawater immersion) | 10 | 10 | 10 | 10 |
| wasting of coating film 3 mo. total | 35.5 | 34.2 | 40.4 | 37.3 |
| wasting of coating film 6 mo. total | 60.2 | 67.6 | 74.8 | 79.3 |

*30% xylene soln. of 4,5-dichloro-2-n-octyl-isothiazolin-3-one

The invention claimed is:

1. An antifouling coating composition comprising:
(A) a metal-containing copolymer obtained by copolymerization of a polymerizable unsaturated monomer (a1) containing zinc, and an unsaturated monomer (a2) not containing a metal, and capable of radical polymerization, wherein the unsaturated monomer (a2) is at least one monomer (a21) of the formula:

$$R^4OOC—C(R^3)=CH_2 \quad (2)$$

wherein $R^3$ represents a hydrogen atom or a methyl, and $R^4$ represents an alkyl, a cycloalkyl or an aryl, and
at least one monomer (a22) of the formula:

$$R^7R^6OOC—C(R^5)=CH_2 \quad (3)$$

wherein $R^5$ represents a hydrogen atom or a methyl, $R^6$ represents an alkylene, a cycloalkylene or an arylene, and $R^7$ represents a hydroxyl, an alkoxyl, a cycloalkoxyl or an aryloxyl, and
wherein the metal-containing copolymer (A) comprises 17.9 to 40% by weight of component units derived from the polymerizable unsaturated monomer (a1) containing zinc and 60 to 82.1% by weight of component units derived from the unsaturated monomer (a2) not containing a metal, and capable of radical polymerization;
(B) from 4.4 to 21.9 parts by weight of 4,5-dichloro-2-n-octyl-4-isothiazolin-3-one per 100 parts by weight of the metal-containing copolymer (A); and
(C) from 4.9 to 34.1 parts by weight of a metal pyrithione compound which is the zinc salt of 2-pyridinethiol-1-oxide or the copper salt of 2-pyridinethiol-1-oxide per 100 parts by weight of the metal-containing copolymer (A),
wherein the antifouling coating composition is substantially free of cuprous oxide and an organotin, and
wherein the antifouling composition has stationary antifouling properties for at least 12 months in sea water, such that when the antifouling composition, coated on steel plates painted with an anticorrosive paint, and the coated plates immersed in seawater for 12 months, the area of attachment on the plates of undersea organisms is 0%.

2. The antifouling coating composition as claimed in claim 1, which is substantially free of at least one of triphenylborane and tetraphenylborane compounds.

3. The antifouling coating composition as claimed in claim 1, which comprises from 4.4 to 20 parts by weight of 4,5-dichloro-2-n-octyl-4-isothiazolin-3-one (B) per 100 parts by weight of the antifouling coating composition.

4. The antifouling coating composition as claimed in claim 1, which comprises from 4.9 to 20 parts by weight of metal pyrithione compound (C) per 100 parts by weight of the antifouling coating composition.

5. The antifouling coating composition as claimed in claim 1, further comprising zinc oxide (D).

6. The antifouling coating composition as claimed in claim 5, which comprises from 5 to 100 parts by weight of the zinc oxide (D) per 100 parts by weight of the metal-containing copolymer (A).

7. The antifouling coating composition as claimed in claim 1, further comprising an extender (E) selected from the group consisting of talc, silica, mica, clay, calcium carbonate and kaolin.

8. The antifouling coating composition as claimed in claim 1, further comprising an organic antifoulant agent (F) that does not contain the 4,5-dichloro-2-n-octyl-4-isothiazolin-3-one (B) and the metal pyrithione compound (C).

9. The antifouling coating composition as claimed in claim 1, wherein the polymerizable unsaturated monomer (a1) containing zinc comprises at least one monomer selected from the group consisting of zinc di(meth)acrylates and low polymerizates thereof and mixtures thereof.

10. The antifouling coating composition as claimed in claim 1, wherein the polymerizable unsaturated monomer (a1) containing zinc is a polymerizable compound obtained by reacting an inorganic zinc compound with a (meth)acrylic acid in the presence of an alcoholic organic solvent and water.

11. The antifouling coating composition as claimed in claim 10, wherein the inorganic zinc compound is zinc oxide, zinc hydroxide or zinc chloride.

12. The antifouling coating composition as claimed in claim 1, wherein the polymerizable unsaturated monomer (a1) comprises:
a metal di(meth)acrylate (a11); and
a metal-containing monomer (a12) of the formula (1):

$$R^1—COO—M—L_n \quad (1)$$

wherein $R^1$ represents an organic group having unsaturated bond, selected from the group consisting of $CH_2=C(CH_3)—$, $CH_2=CH—$, $HOOC—CH=CH—$ and $HOOC—CH=C(CH_3)—$, provided that $—COOH$ may form a metal salt or an ester;
the metal of (a11) and M each represents zinc,
L is an organic acid residue represented by $—OCOR^2$ (wherein $R^2$ represents an alkyl, a cycloalkyl, a substituted aromatic hydrocarbon group, an unsubstituted aromatic hydrocarbon group or an aralkyl), and
n is the number equal to the valence number of metal $M-1$.

13. The antifouling coating composition as claimed in claim 12, wherein the metal-containing copolymer (A) is a copolymer comprising:
0.1 to 39.9% by weight of component units derived from the metal di(meth)acrylate (a11);
0.1 to 39.9% by weight of component units derived from the metal-containing monomer (a12) represented by the formula (1); and
60 to 82.1% by weight of component units derived from the unsaturated monomer (a2) not containing a metal, and capable of radical polymerization.

14. The antifouling coating composition as claimed in claim 13, wherein said component units derived from the unsaturated monomer (a2) not containing a metal comprise:

0.1 to 82.0% by weight of component units derived from the monomer (a21) represented by the formula (2); and 0.1 to 82.0% by weight of component units derived from the monomer (a22) represented by the formula (3).

15. An antifouling coating film produced from the antifouling coating composition as claimed in claim 1.

16. An apparatus covered with a coating film produced from the antifouling coating composition as claimed in claim 1.

17. The apparatus of claim 16 which is a marine vessel, an underwater structure, a fishing gear, or a fishing net.

18. A method of rendering a marine vessel or an underwater structure antifouling, the method comprising:

covering a surface of the marine vessel or underwater structure with a coating film produced from the antifouling coating composition as claimed in claim 1.

19. A method of rendering a fishing gear or a fishing net antifouling, the method comprising:

covering a surface of the fishing gear or the fishing net with a coating film produced from the antifouling coating composition as claimed in claim 1.

* * * * *